United States Patent [19]

Tamamura et al.

[11] Patent Number: 4,559,112
[45] Date of Patent: Dec. 17, 1985

[54] ELECTRICALLY CONDUCTING POLYMER FILM AND METHOD OF MANUFACTURING THE SAME

[75] Inventors: Toshiaki Tamamura, Katsuta; Osamu Niwa, Mito, both of Japan

[73] Assignee: Nippon Telegraph & Telephone, Tokyo, Japan

[21] Appl. No.: 657,314

[22] Filed: Oct. 2, 1984

[30] Foreign Application Priority Data

| Oct. 7, 1983 | [JP] | Japan | 58-186991 |
| Nov. 15, 1983 | [JP] | Japan | 58-213201 |
| Nov. 15, 1983 | [JP] | Japan | 58-213203 |
| Nov. 15, 1983 | [JP] | Japan | 58-213204 |
| Feb. 24, 1984 | [JP] | Japan | 59-32595 |
| Apr. 27, 1984 | [JP] | Japan | 59-84076 |
| Jun. 4, 1984 | [JP] | Japan | 59-113099 |
| Jun. 15, 1984 | [JP] | Japan | 59-121916 |
| Jun. 29, 1984 | [JP] | Japan | 59-132905 |
| Jul. 13, 1984 | [JP] | Japan | 59-144453 |

[51] Int. Cl.[4] ............ C25D 1/04; C25C 3/00
[52] U.S. Cl. ............ 204/12; 204/13; 204/27; 204/28; 204/38.7; 204/59 R; 204/180.9; 428/413; 428/421; 428/447; 428/473.5; 428/483; 428/500; 428/507; 428/515; 428/522; 428/523; 428/524
[58] Field of Search ............ 204/59 R, 12, 13, 28, 204/38.4, 38.7, 27, 180.9; 428/413, 421, 447, 473.5, 483, 500, 507, 515, 522, 523, 524

[56] References Cited

U.S. PATENT DOCUMENTS

| 4,321,114 | 3/1982 | MacDiarmid . | |
| 4,401,545 | 8/1983 | Naarmann . | |
| 4,407,739 | 10/1983 | Naarmann . | |
| 4,420,506 | 12/1983 | Nelissen | 204/38.4 |
| 4,468,291 | 8/1984 | Naarmann | 204/78 |
| 4,487,667 | 12/1984 | Traynor | 204/59 R |

OTHER PUBLICATIONS

Journal of Chemical Society, Chemical Communication, 1979, p. 635, "Electrochemical Polymerization of Pyrrole", by A. F. Diaz et al.

Primary Examiner—John F. Niebling
Attorney, Agent, or Firm—Townsend & Townsend

[57] ABSTRACT

A conducting polymer film has an insulating polymer film as a base, and a conducting aromatic polymer compound is contained by electrochemical polymerization in at least part of the insulating polymer film.

28 Claims, 16 Drawing Figures

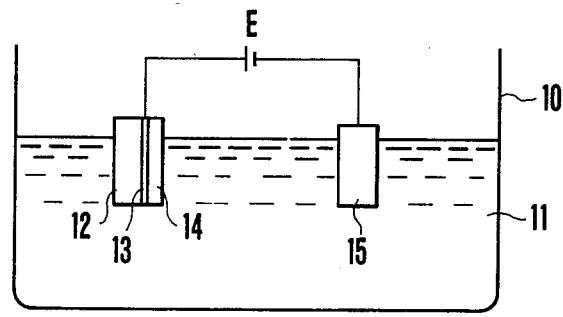
FIG. 1
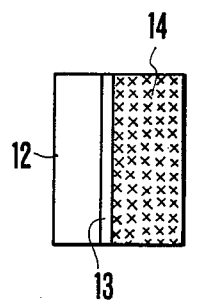 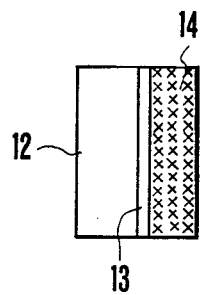 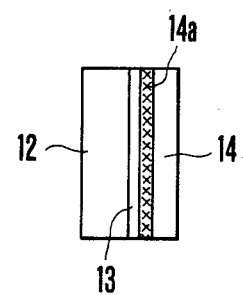
FIG. 2A   FIG. 2B   FIG. 2C

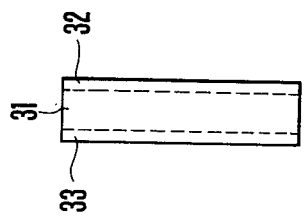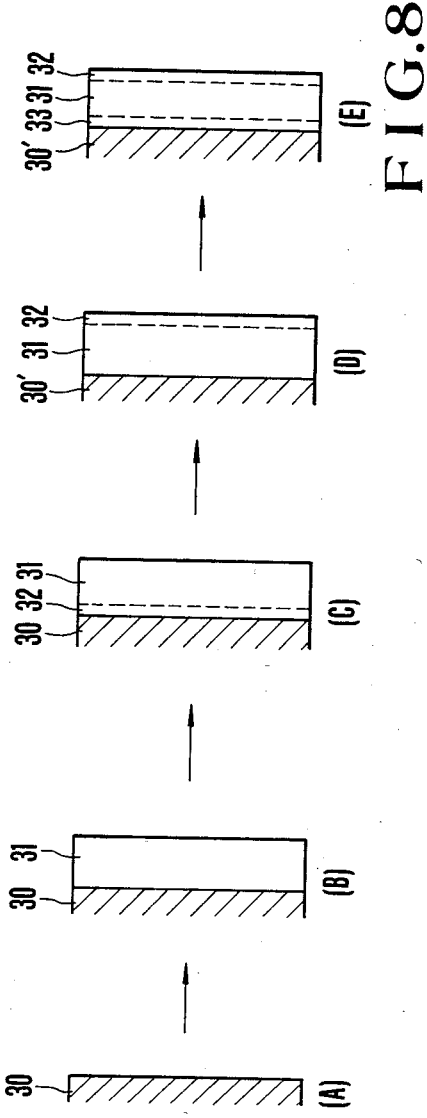

ELECTRICALLY CONDUCTING POLYMER FILM AND METHOD OF MANUFACTURING THE SAME

BACKGROUND OF THE INVENTION

The present invention relates to an electrically conducting polymer film and a method of manufacturing the same.

Conventional electrically conducting polymer films are classified into the following two types:

One is a general-purpose polymer material containing carbon black or a metal such as aluminum or stainless steel as a conductive filler. A resultant electrically conducting polymer films have an electrical conductivity of 1 to $10^{-13}/\Omega.cm$ and is used as an antistatic agent, an electromagnetic interference preventing material or the like. This film is prepared such that a polymer is fused and a filler is added thereto, and a resultant material is kneaded and molded. Therefore, a complicated, high-precision process must be used with high reliability of control, resulting in high cost. In addition, it is difficult for this film to obtain an electrical conductivity higher than $1/\Omega.cm$. In order to achieve a high electrical conductivity, the amount of filler must be increased. These excess amount of filler reduces the mechanical strength of the resultant film. Because of this poor mechanical property, a thin film cannot be easily prepared.

The other conventional electrically conducting polymer comprises a polymer material with electrical conductivity. This type of polymer has been developed as a material for various functional elements, polymeric superconductors and molecular device materials which are receiving a great deal of attention these days. For example, the conventional electrically conducting polymer comprises polyacetylene, polyphenylene-sulfide, polyparaphenylene or the like. The main feature of these films lies in the fact that the polymer chains are consisted of conjugated double bonds, so that carriers are easily mobile along a molecular chain. When a proper impurity is doped, a high electrical conductivity of more than $10/\Omega.cm$ can be achieved. However, this class of materials is generally unstable in air, and workability of the film is also degraded.

In addition to these conventional films, it was reported that some aromatic compounds are electrochemically polymerized in its solution containing an electrolyte forming an electrically conducting polymer film on an electrode substrate. Aromatic compounds of this type comprise heterocyclic compounds (e.g., pyrrole and thiophene) or polyaromatic compounds such as azulene, pyrene and triphenylene (e.g., J. Bargon, S. Mohmand and R. J. Waltman, IBM Journal of Research & Development, Vol. 27, No. 4, P. 330, 1983).

However, a conventional electrically conducting polymer film formed by electrochemical polymerization on the electrode substrate has the following disadvantages:

(1) Since the mechanical strength of the film is weak, the films on the substrate or separated from the substrate are relatively fragile. Moldability of this film becomes poor.

(2) Adhesion between film and substrate is weak, so that the film tends to peel from the substrate during film formation or cleaning.

(3) The film surface is very coarse, and tends to lose gloss.

(4) The resultant film is insoluble and cannot be fused, resulting in poor moldability.

(5) When an electrode substrate such as Nesa glass which has a high electrical resistance as compared with those of electrolytic solution and resultant polymer film is used, the film thickness becomes non-uniform.

(6) Since impurity doping occurs at the same time with the polymerization, it is difficult to control the electrical conductivity of film.

(7) Even a film having low electrical conductivity becomes black and has low transmittance of visible light. The resultant film cannot be colored.

SUMMARY OF THE INVENTION

The principal object of the present invention is to provide an electrically conducting polymer film which has high mechanical strength and can be thin, if needed, and a method of manufacturing the same, wherein electrical conductivity can be controlled in a wide range.

It is another object of the present invention to provide an electrically conducting polymer film having high electrical conductivity and a mechanical strength greater than ever before achieved and a method of manufacturing the same even if the film has high electrical conductivity.

It is still another object of the present invention to provide an electrically conducting polymer film with excellent workability and a method of manufacturing the same.

It is still another object of the present invention to provide an electrically conducting polymer film having a high transmittance of visible light and a method of manufacturing the same.

It is still another object of the present invention to provide an electrically conducting polymer film having good adhesion with a substrate and a method of manufacturing the same.

In order to achieve the above objects of the present invention, there is provided an electrically conducting polymer film comprising an insulating polymer film and an electrically conducting aromatic polymer layer formed by electrochemical polymerization.

BRIEF DESCRIPTION OF THE DRAWINGS

FIG. 1 is a representation for explaining a method of manufacturing an electrically conducting polymer film according to the present invention;

FIGS. 2A, 2B and 2C are respectively sectional views showing the basic structures of electrically conducting polymer films prepared by the present invention;

FIG. 7 is a sectional view showing an electrically conducting polymer film according to another embodiment of the present invention;

FIG. 8 shows the steps in manufacturing the polymer film shown in FIG. 7;

DESCRIPTION OF THE PREFERRED EMBODIMENTS

Figure 3:
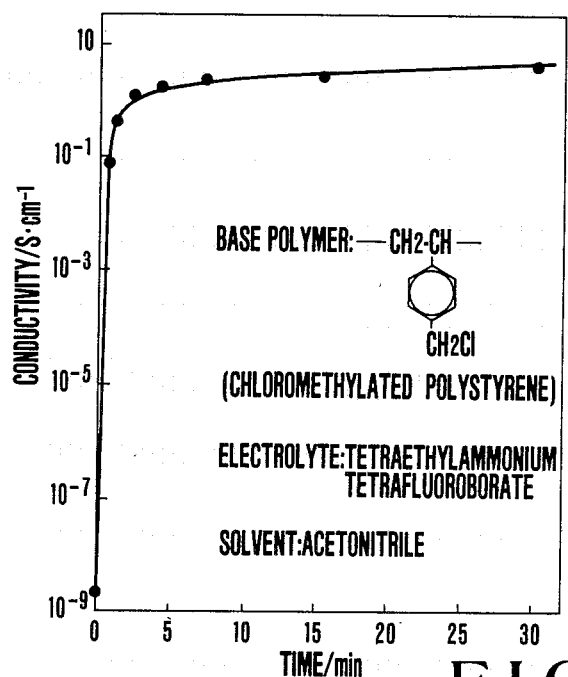
FIG. 3 is a graph showing the relationship between polymerization time and conductivity of a typical electrically conducting polymer film obtained by the present invention.

An electrically conducting polymer film according to the present invention is manufactured by the principle of the method shown in FIG. 1. Referring to FIG. 1, one of the electrodes dipped in a solution 11 containing an aromatic compound subjected to electrochemical polymerization, a solvent and an electrolyte has a conducting layer 13 such as a conducting metal oxide film serving as an electrode on a substrate 12. An insulating polymer film 14 is formed on the conducting layer 13. The electrode having the construction described above is dipped in the solution 11 together with another counter electrode 15. A voltage E is applied between two electrodes.

In this case, since the electrode substrate is coated with the insulating polymer film, a current does not flow through the insulating polymer film. As a result, a conducting film will not be formed on the substrate. However, the present inventors have conducted an experiment by using the arrangement described above and found that an electrochemical polymerization occurred even on the insulated electrode surface and that a conducting polymer layer was formed in the insulating polymer film.

Many aromatic compounds can be used as monomer in this invention, but pyrrole is mainly used to explain the details of the present invention. Since polymer films coated on the surface of the electrode are almost insulator having an electrical conductivity of less than $10^{-10}/\Omega\cdot cm$, polymerization of pyrrole is not considered to occur. However, when a solvent and an electrolyte are properly selected with respect to the insulating polymer film, pyrrole molecules, and electrolyte anion diffuse in the polymer film and polymerization occurs. The structure of resultant film varies in accordance with the type of insulating polymer film employed as the base and composition of a solution subjected to the polymerization reaction. As a result of this process, roughly three types of structures can be obtained, as shown in FIGS. 2A, 2B and 2C, respectively.

Pyrrole electrochemical polymerization on the electrode covered with the insulating polymer film is initiated on the electrode surface by pyrrole being diffused in the film and the electrolyte, so that conducting polypyrrole is produced at an interface between the electrode and film. When the produced polypyrrole grows within the insulating polymer film, the surface (to be referred to as an electrode side hereinafter) of the film which is in contact with the electrode becomes conductive. This state is illustrated in FIG. 2A, wherein the opposing surface (to be referred to as a surface side hereinafter) of the film is kept insulative. When electrochemical polymerization continues, the conducting portion in the film is increased. Finally, polypyrrole grows to reach the surface, and the film becomes entirely conductive. This state is illustrated in FIG. 2B. Normally, two states shown in FIGS. 2A and 2B are obtained. However, when miscibility between the conducting aromatic polymer and the insulating polymer film is poor, or adhesion between the insulating polymer film and the electrode is not sufficient, a conducting polymer layer having a multilayer structure shown in FIG. 2C is formed between the electrode and the polymer film. In this case, the resultant multilayer film often shows a weak adhesion between the insulating polymer film and the conducting polymer layer, and two layers tend to separate from each other. These films causes a problem in practice. However, when two or more insulating polymer films are laminated as will be described later, this multilayer structure is effective.

The structures adopted in the present invention will be mainly those illustrated in FIGS. 2A and 2B.

The features of the electrically conducting polymer films thus prepared are summarized as follows. However, effects of the films are not limited to these, as will be apparent from the following description.

(1) The electrical conductivity can vary from a low conductivity of the insulating material to a high conductivity of about $10^2/\Omega\cdot cm$. The electrical conductivity can change by the polymerization time, as shown in FIG. 3. In this case, electrical conductivity is low at the very beginning of polymerization and is gradually increased, thereby obtaining a film of uniform thickness.

(2) Since the electrically conducting polymer film is obtained in the insulating polymer film employed as a base, the resultant conducting polymer film can be thin. In addition, by selecting a suitable insulating polymer film, the resultant film can have high mechanical strength.

(3) The present invention can be applied to almost all insulating polymer films.

(4) The manufacturing method is simple, and a low-cost electrically conducting polymer film can be obtained.

(5) When an insulating polymer film having high adhesion with the electrode surface is used, or a noble metal substrate is used as electrode, an electrically conducting polymer film having good adhesion with the substrate can be obtained.

(6) Even if a transparent electrode such as Nesa glass (trade name) or indium tin oxide (ITO) having a relatively high surface resistance is used, polymerization can be performed uniformly, thereby obtaining a film having uniform electrical conductivity.

(7) Although a conventional electrically conducting polymer has a color close to black, a film having a high transmittance can be obtained by adjusting the electrochemical polymerization time according to the present invention.

Figure 4:
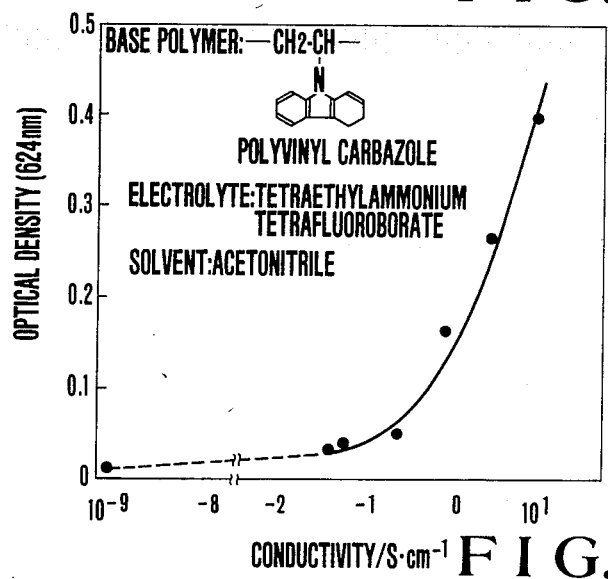
FIG. 4 is a graph showing the relationship between conductivity and transmittance of the typical electrically conducting polymer film obtained by the present invention.

FIG. 4 shows the relationship between optical density and conductivity of polypyrrole polyvinylcarbazole composite film prepared by this invention.

Typical examples of the various materials used in the present invention will be described hereinafter.

An insulating polymer film used in the present invention may comprise: polystyrene; a polystyrene derivative such as chloromethylated polystyrene and polychlorostyrene; a copolymer between styrene and a monomer (e.g., various vinyl esters, vinyl ethers, acrylic acids and their esters, metacrylic acids and their esters, maleic acid and its esters, fumaric acid and its esters, maleic anhydride, halogenovinylidene compounds, vinylchloride acrylonitrile, methacrylonitrile and propylene); or a copolymer of styrene with any aromatic vinyl polymer such as polyvinyl carbazole. Furthermore, the insulating polymer film may comprise a polyvinylchloride resin (i.e., polyvinyl chloride and a copolymer of vinyl chloride with a monomer described above). The insulating polymer film may also comprise a copolymer between vinylidene chloride and one of various vinyl esters, vinyl ethers, acrylonitrile, methacrylonitrile and vinylchloride; polyvinylidene fluoride or a copolymer of vinylidene fluoride with monomer described above, or polyvinyl acetate or copolymer of vinyl acetate with monomer described above. The insulating polymer film may comprise polyethylene, a copolymer of ethylene with a monomer as described above, polyethylene telephthalate, any nylon, polycarbonate, any cellulose, polyvinyl alcohol, rubber or the like.

The insulating polymer film may also comprise a thermosetting resin such as epoxy resin, phenol resin, melamine resin, urea resin, acetal resin, polyimide resin, RTV silicone resin.

The insulating polymer film may comprise a polymer film obtained by plasma polymerization.

Additives such as a plasticizer, a pigment, a plastid, a conductive filler, a defogging agent and a rust inhibitor may be used. In this case, it is desired to use the additives which handly dissolve in the electrolytic solution.

An aromatic compound subjected to electrochemical polymerization can be selected from pyrrole, 3-methylpyrrole, N-methylpyrrole, N-phenylpyrrole, thiophene, 3-methylthiophene, aniline, furan, phenol, thiophenol, selenophene, tellurophene, biphenyl, azulene, p-terphenyl, o-terphenyl, 2-hydroxybiphenyl, diphenylsulfide, 2-(α-thienyl)thiophene, 2-(α-thienyl)furan, 2-(2-pyrrolyl)pyrrole, 2-(2-pyrrolyl)thiophene, 2-phenylthiophene, α-thienylphenyl ether, β-furanyl-α-thienylselenide, 2-(2-pyrrolyl)selenophene, 2-(2-seleninyl)tellurophene, N-vinylcarbazole, N-ethynylcarbazole, methylazulene and pyrene.

An electrically conducting polymer solution must have a proper composition adjusted for the type of insulating polymer film used. The solution must satisfy at least the following conditions:

(1) The solution does not dissolve the insulating polymer film.

(2) The solution dissolves an aromatic compound which can be electrochemically polymerized with the electrolyte.

(3) The solution has an affinity with the insulating polymer so that an aromatic compound which can be subjected to electrochemical polymerization can be diffused in the insulating polymer film.

An electrolyte for electrochemical polymerization comprises any compound such as organic quaternary ammonium salts, inorganic salts, or strong acids of protone acid. An acetonitrile solvent is normally used. However, any solvent can be used when the solvent allows the aromatic compound to perform electrochemical polymerization and dissolves a proper electrolyte. For example, the solvent is selected from a nitrobenzene-based solvent, a propylene carbonate-based solvent, an ethylene glycol-based solvent, an aqueous solvent, an N,N-dimethylformamide-based solvent, and a dimethylsulfoxide-based solvent. However, any other solvent may, if necessary, be used.

An electrochemical polymerization substrate comprises a noble metal such as gold, platinum and palladium; a base metal such as nickel, chromium and stainless steel; a conducting metal oxide such as, stannic oxide, indium oxide and ITO (indium tin oxide); an inorganic semiconductor such as silicon and amorphous silicon; or a material obtained by depositing one of the above materials on a proper substrate, by means of evaporation, sputtering, CVD, plating, or coating. The electrochemical polymerization substrate may comprise a laminate obtained by stacking at least two layers of the above-mentioned electrode materials. An electrode laminate may be formed into a drum to produce films continuously.

The resultant electrically conducting polymer film can be used as an electromagnetic interference preventing film, an antistatic film, a photosensitive image sensor film, a solar battery film, and so on.

In addition, the present inventors found that at least two different insulating films can be layered in the electrochemical polymerization, and that a resultant layered film had often superior film quality to that of a single conducting film.

Figure 5:
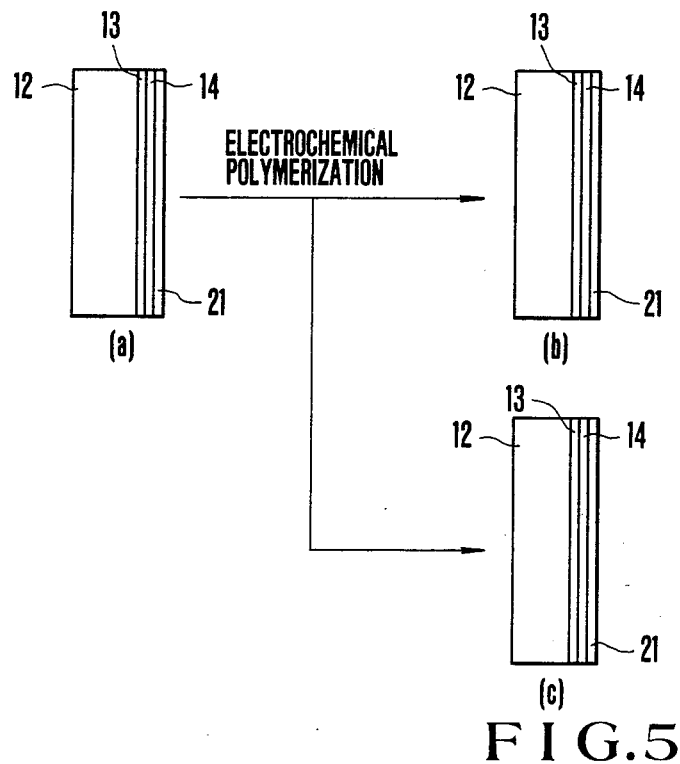
FIGS. 5 and 6 are, respectively, sectional views for explaining steps in manufacturing two- and three-layer electrically conducting polymer films on corresponding electrode substrates by means of electrochemical polymerization according to the present invention.

As shown in FIG. 5, a first insulating polymer film 14 is coated on a substrate 12 having an electrode 13. A second insulating polymer film 21 is formed on the first insulating polymer film 14 in a state (a). The electrochemical polymerization of aromatic compounds by using this electrode produces a two-layer composite electrically conducting polymer film.

In this case, the aromatic polymer is mixed in the two layers 14 and 21 as shown in state (b), or is mixed only in the layer 14 as shown in state (c).

Even an insulating polymer film having at least three layers can be a composite electrically conducting polymer film having a multi-layer structure by properly selecting the type and thickness of the polymer film and the type of solvent.

When a polymer compound containing an epoxy group such as polyglycidyl methacrylate, or a polymer compound containing an OH group such as novolak resin is used as the insulating polymer film, a resultant conducting film is strongly adhered to the electrode surface.

On the other hand, when an aromatic polymer such as polystyrene, chloromethylated polystyrene, polyvinylphthalate, or polyvinylcarbazole is used to form the insulating polymer film, a relatively uniform composite electrically conducting polymer film having a controlled electrical conductivity is obtained. However, this polymer film has weak adhesion to the substrate and can be easily peeled therefrom.

When an aromatic polymer layer is laminated on a polymer layer having good adhesion with electrode surface, the electrochemical polymerization produces a uniform composite electrically conducting film which has good adhesion and uniform and controllable conductivity.

When a polymer film, which has poor miscibility with electrically polymerized conductive polymer, such as polyethylene or polypropylene type polymer is used as top layer of two-layer insulating film, a two-layer structure having a composite layer of conductive polymer with bottom insulating film and top polymer film which is still insulated can be easily obtained. This insulating film can be used as protective layer of electrically conducting film.

In the case of combination of an aromatic polymer film as bottom layer and a polymer film with poor miscibility as top layer the electrochemical polymerization produces uniform, conductivity-controlled composite electrically conducting polymer covered with an insulating polymer film.

Figure 6:
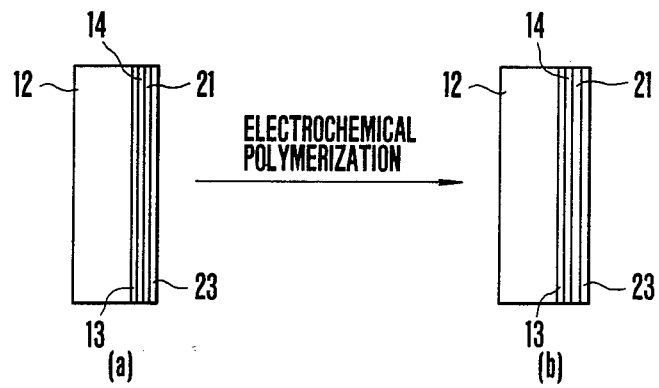

When three kinds of polymer film are laminated, a multilayer composite conducting polymer film having a combination of respective layers can be obtained. As shown in FIG. 6, a polymer film (first layer) 14 having good adhesion with a substrate 12 is formed on the substrate 12 having a conductive surface (an electrode) 13 thereon. An aromatic polymer film (second layer) 21 for controlling electrical conductivity is formed on the first layer 14. A polymer film (third layer) 23 with poor miscibility is formed on the second layer 21. The resultant substrate (a) is electrochemically polymerized to obtain a form, conductivity-controlled composite electrically conducting polymer film having good adhesion, which are covered with insulating polymer film.

According to the conducting polymer film of the present invention, the transparency of film is improved, as previously described.

The present inventors found that when the insulating polymer film was made conductive and the electrochemical polymerization time was shortened, the electrical conductivity could not be greatly increased, but the resultant semiconducting film had high transmittance to visible light: However, when a film has a practical thickness such as, more than 20 μm, short polymerization time cannot make the whole film conductive and only the film surface which is in contact with the electrode surface becomes conductive. When the resultant film is used as a semiconductor film having a high transmittance to visible light, only one conductive surface is utilized.

On the other hand, when both surfaces of the film having the thickness described above are made conductive, the electrochemical polymerization time must be prolonged, thereby decreasing the transmittance.

According to the present invention, a conducting polymer film with electrochemical polymers mixed in the surface and electrode side layers of the film can be provided although the entire film is not made conductive.

FIG. 7 shows a typical example of the above case. Referring to FIG. 7, upper and lower surface layers 32 and 33 of an insulating polymer film 31 comprise a composite structure obtained by electrochemically polymerizing the aromatic compound in the polymer film.

Thickness of the composite conducting surface layer greatly depends on electrochemical polymerization conditions of the aromatic compound, especially, electrochemical polymerization time. When the polymerization time is increased, the thickness of the conductive composite layer is increased. As a result, the entire film is made conductive, and no insulating part will appear.

FIG. 8 shows steps of a method of manufacturing a conducting polymer film according to the present invention. Reference numerals 31 to 33 in FIG. 8 denote the same parts in FIG. 7. Reference numerals 30 and 30' denote electrodes. An insulating polymer film 31 is adhered to an electrode 30 (step A). The electrode 30 is used as a positive electrode, and electrochemical polymerization of an aromatic compound is performed in an electrochemical polymerization solution. An electrochemical polymer is formed in a surface layer 32 of the polymer film which is in contact with the electrode 30 (step B). The resultant film is peeled from the electrode, and the opposite surface is adhered to the electrode 30' (step C). This electrode is used as the positive electrode, and electrochemical polymerization of an aromatic compound is performed in the electrochemical polymerization solution. A composite electrochemical polymer is formed in the surface layer 33 adhered to the surface thereof which is in contact with the electrode 30' (step D). A conducting polymer film having upper and lower conducting layers is prepared (step E).

In the above process, the electrodes 30 and 30' may be the same or different in respective steps. In addition, the electrochemical polymerization solution used in step B may be the same as or different from that in step D. In other words, electrochemical polymers of different types of aromatic compounds may be used.

Figure 9:
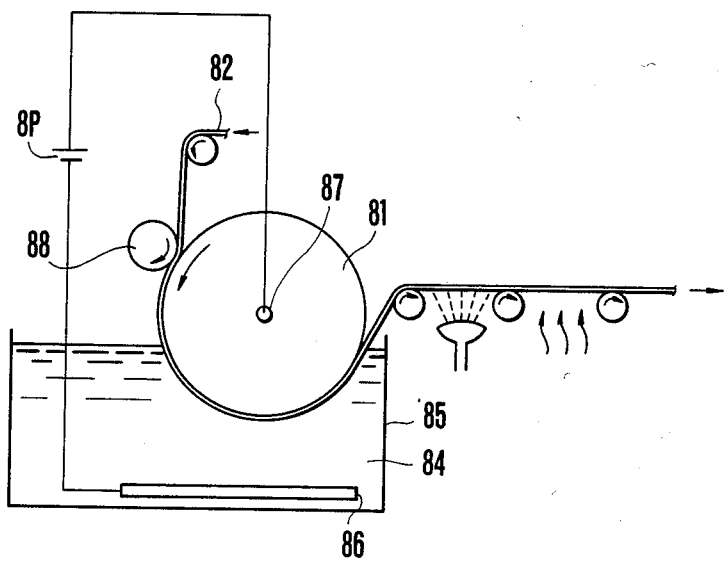
FIG. 9 shows an apparatus for manufacturing an electrically conducting polymer film by using a cylindrical electrode in accordance with electrochemical polymerization.

In order to manufacture an electrically conducting polymer film according to the present invention, a continuous manufacturing apparatus using a cylindrical electrode can be used to improve productivity and decrease manufacturing cost. FIG. 9 is a side view of a conducting film forming apparatus using the cylindrical electrode in accordance with electrochemical polymerization. Referring to FIG. 9, reference numeral 81 denotes a cylindrical electrode; 82, a film; 83, a thermal transfer roller; 84, an electrochemical polymerization solution; 85, an electrochemical polymerization tank; 86, a counter electrode; 87, a terminal; 88, a guide roller; and 89, a power source.

An insulating polymer film is adhered by the thermal transfer roller 83 to the cylindrical electrode 81. The thermal transfer roller 83 is slowly rotated to dip the film in the electrolytic solution. A voltage is applied between the counter electrode 86 and the terminal 87 so as to perform electrochemical polymerization. Polymerization continues for a time period during which the film is being dipped in the solution. The polymerized film is peeled from the cylindrical electrode and washed and dried. The dried film is then wound.

Instead of adhering the film by the thermal transfer roller, the film can be directly formed by casting on the roller, thereby continuously forming the conducting film. In addition, an electrode material is proposed according to the present invention which allows formation of a conducting polymer film of large area. When electrochemical polymerization is performed, the polymer film must be adhered to the electrode and must be easily peeled from the electrode so as to obtain a uniform conducting film of large area when polymerization is completed. However, when a noble metal substrate as previously mentioned is used, the substrate has uniformity but is expensive. In addition, it is often difficult to peel the film from the substrate. When a base metal is used, it has uniformity but the film cannot easily be peeled off. When electrochemical polymerization reaction is repeatedly performed, the surface of the base metal electrode is often degraded by a side reaction. When a metal oxide such as ITO is used, it has a higher resistance than that of a metal substrate. As a result, a slight resistance distribution of the conducting film occurs.

In order to overcome these problems, a conducting metal oxide layer or a doped semiconductor layer is laminated on the base metal layer so as to constitute the most suitable electrode.

Figures 10, 11:
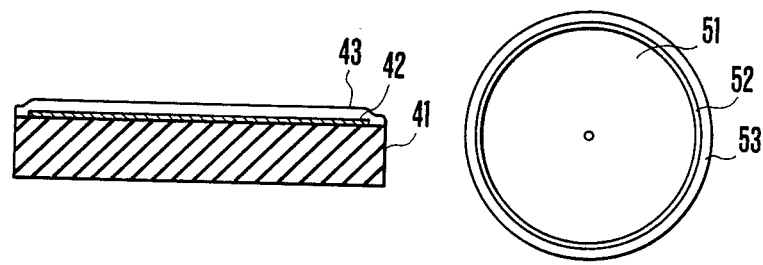
FIGS. 10 and 11 are, respectively, representations showing plate-like and cylindrical (FIG. 9) electrochemical polymerization electrodes used for manufacturing an electrically conducting polymer film according to the present invention.

FIG. 10 shows a laminate obtained such that a base metal layer 42 is formed on an insulating substrate 41, and such that an electrically conducting metal oxide layer or a doped inorganic semiconductor layer 43 is formed. The base metal layer comprises aluminum, chromium, nickel, stainless steel or copper and is formed by evaporation, sputtering or the like. The thickness of the base metal layer may slightly vary in accordance with electrical conductivity, but must be more than 500 so as to obtain a uniform electrically conducting electrochemical polymer.

The electrically conducting metal oxide layer or doped inorganic semiconductor layer is laminated on this base metal layer. The conducting metal oxide comprising tin oxide, indium oxide, indium tin oxide (ITO) or the like is normally formed by evaporation or sputtering.

An inorganic semiconductor may be used as a laminate layer in addition to the metal oxide. In this case, a substantial amount of impurity is doped in a semiconductor layer so as to effectively decrease electrical resistance. Amorphous or polysilicon is the best material for such a uniform semiconductor layer without pinholes. However, germanium or gallium arsenide may be used in place of amorphous silicon. The laminate is formed by CVD, sputtering or the like. An impurity is doped in a corresponding semiconductor material.

FIG. 11 shows a cylindrical electrode for continuously forming an electrically conducting polymer film. In order to continuously form a conducting film by electrochemical polymerization, it is pereferable to form an electrode in a drum-like shape. Referring to FIG. 11, when an electrically conducting metal oxide layer or a doped inorganic semiconductor layer 53 is formed on a base metal drum 51, a base metal layer 52 is formed on the surface of a drum made of any material, and the electrically conducting metal oxide layer or the doped inorganic semiconductor layer 53 is laminated on the base metal layer 52. A film is formed on the drum-like electrode, and electrochemical polymerization is performed in the electrochemical polymerization tank while the drum is being rotated. The resultant conducting polymer film is peeled from the drum and washed. Thus, a uniform film can be continuously formed, and repeated use of the electrode can be obtained.

In order to make the diffusion of aromatic compound to be polymerized and electrolyte anion in the insulating polymer film much easier, the film may comprise a porous material. In this porous film the electrolyte and the aromatic compound tend to be diffused, and polymerization is accelerated, thereby obtaining a uniform conducting film for a shorter polymerization time.

A method of preparing a porous polymer film is known wherein a gel of a polymer solution is prepared and a solvent or the like is removed or any foaming agent is used. A porous material prepared by a solvent extraction method or neutron radiation method is commercially available.

Such a porous material can be used as a film which will be made conductive according to the present invention. However, in this case, a porous film must be adhered to the electrode. For this reason, various methods may be proposed. Utilizing a simplest method, a porous film is adhered to the electrode through a thin phenol or epoxy adhesive layer. In this case, the phenol or epoxy resin layer is also made conductive.

According to the present invention, when thickness of an electrically conducting film is small, it is uniform and has high electrical conductivity. However, when thickness is increased, the film becomes nonuniform. In order to solve this problem, a conductivity filler may be used.

Examples of the filler may include: a carbon material such as carbon powder, carbon fiber and acetylene black; powder or flake of a metal such as aluminum, copper and stainless steel; a powder or flake of a conducting metal compound such as indium oxide and titanium oxide; a powder or flake of a noble metal such as gold, platinum, rhodium and palladium; and a powder or flake of a base metal such as nickel, stainless steel, and brass. However, a metal such as aluminum and copper is partially subjected to a side reaction when electrochemical polymerization of an aromatic compound is performed. Therefore, these metals are not preferred.

When thickness is increased or miscibility between the insulating polymer film and the aromatic polymer material obtained by electrochemical polymerization is poor, a uniform conducting film cannot be formed. In order to improve this, a removable material is premixed in a polymer film when the polymer film is coated on the electrode substrate.

This material is removed before and during the reaction, and a number of small voids are formed in the polymer film. For this reason, the electrolyte and the aromatic compound tend to be diffused in the film, and polymerization is accelerated. As a result, a uniform electrically conducting polymer film is prepared.

The removable material is preferably mixed with the polymer film for the above reason so as to form a uniform film. The removable material may comprise a material (e.g., low-melting point halogenated hydrocarbon, phthalic anhydride and camphor) which is volatile by heat and/or reduced pressure; a material (e.g., an aromatic compound as a raw material for pyrrole, an electrolyte, or an electrolyte-soluble material such as dialkylphthalate) soluble in an electrolytic solution; or a combination of the solvent-soluble material and a solvent (i.e., a combination of sodium chloride and water). The removable material is then removed before and during the reaction.

The present invention will now be described by way of examples. However, the present invention will not be limited to these examples.

EXAMPLE 1

As shown in FIG. 1, chloromethylated polystyrene (to be referred to as a CMS hereinafter; molecular weight: 300,000) was coated by spin coating on a substrate 12 having Nesa glass to form a film 13. The substrate coated with the film 13 was illuminated by an Xe lamp for 10 minutes so as to perform CMS crosslinking. This substrate was used as a cathode, and a platinum mesh was used as an anode. The substrate was dipped in the electrolytic solution, and a constant voltage of 1.3 V was applied between two electrodes, thereby electrochemically polymerizing pyrrole.

The electrolytic solution was prepared such that 1 mol/l of pyrrole and 0.3 mol/l of electrolytic salt (tetraethylammonium tetrafluoroborate) were dissolved in acetonitrile. The electrochemical polymerization was carried out for 10 minutes. Although the Nesa glass substrate is covered with the insulating film (CMS) having a thickness of 1 micron, black polypyrrole was produced on the substrate when electrolysis was completed.

The insulating film was rinsed with acetonitrile and dried under a reduced pressure for 24 hours. Thereafter, the insulating film was kept in a dark place. The resultant CMS/polypyrrole composite film had good adhesion with the substrate and good mechanical strength, as compared with the case wherein polypyrrole was directly precipitated on the Nesa glass substrate.

The CMS/polypyrrole film was peeled from the Nesa glass substrate. The electrical conductivity of the resultant film was measured. This measurement was performed as follows. Gold was deposited on the CMS/polypyrrole film by using a metal mask so as to constitute a gold electrode having a predetermined area. Lead wires were connected to the gold electrode, and the electrical conductivity was measured in accordance with a 4-terminal method. The electrical conductivity of the CMS/polypyrrole film was determined to be $5.2/\Omega\cdot cm$.

EXAMPLES 2 to 8

In the same manner as in Example 1, novolak resin (Examples 2 and 3), resole resin (Example 4), AZ-1350 (Example 5) available from Shipley, RTV (room temperature vulcanizing) silicone rubber (Example 6), polyglycidylmethacrylate (Example 7), and butadiene rubber (Example 8) were spin-coated on corresponding conducting substrates. The coated materials were crosslinked by heat or high-energy radiation. On the resultant substrates, pyrrole was electrochemically polymerized in accordance with the same technique as in Example 1, thereby obtaining cross-linked polymer/polypyrrole composite films. The thicknesses and conductivities of the resultant films are summarized in Table 1. In either case, the film had high electrical conductivity. Reference symbol EG denotes ethylene glycol.

In particular, the conducting films of Examples 6 and 8 could be elongated or stretched by over 50%, and the mechanical strength thereof were be greatly improved.

EXAMPLES 9 to 15

In the same manner as in Example 1, CMS was spin-coated on Nesa glass and crosslinked upon light radiation. This substrate was used as the cathode. The respective substrates are dipped in solutions of thiophene (Example 9), 3-methylpyrrole (Example 10), N-methylpyrrole (Example 11), azulene (Example 12), methyl azulene (Example 13), pyrene (Example 14) and carbazole (Example 15). A counter electrode comprised a platinum electrode. As a result, CMS/conducting polymer films were prepared by electrochemical polymerization. These films had higher mechanical strength than the single polypyrrole film in the same manner as in Example 1. The thicknesses and conductivities of the resultant films are summarized in Table 2. The substrate comprised Nesa glass, the crosslinking polymer was CMS, the electrolytic salt was fluoroborate, perchlorate, sulfate or the like.

TABLE 2

| Example | Conductive polymer | Solvent composition (excluding pyrroles and salts) | Total thickness ($\mu$m) | Conductivity (/$\Omega \cdot$ cm) |
|---|---|---|---|---|
| 9 | Polythiophene | Nitrobenzene/ethanol = 2:1 | 1.5 | 5.0 |
| 10 | Poly-3-methylpyrrole | $CH_3CN$ | 1.5 | 1.5 |
| 11 | Poly-N—methylpyrrole | $CH_3CN$ | 1.7 | $1 \times 10^{-3}$ |
| 12 | Polyazulene | $CH_3CN/H_2O/EG = 98/1/1$ | 1.8 | $<10^{-3}$ |
| 13 | Polymethylazulene | $CH_3CN/H_2O/EG = 98/1/1$ | 2.0 | $<10^{-3}$ |
| 14 | Polypyrene | $CH_3CN$ | 2.0 | $<10^{-5}$ |
| 15 | Polycarbazole | $CH_3CN$ | 1.6 | $<10^{-3}$ |

EXAMPLE 16

Chloromethylated polystyrene (to be referred to as CMS; molecular weight: 300,000) was spin-coated on a Nesa glass substrate to a thickness of 1 $\mu$m. The substrate coated with this film was used as a cathode, and a net-like platinum electrode was used as an anode. The substrate was dipped in the electrolytic solution, and pyrrole was electrochemically polymerized at a constant voltage of 0.9 to 1.5 V. The electrolochemical solution was prepared such that 1 mol/l of pyrrole and 0.3 mol/l of tetraethylammonium tetrafluoroborate as the electrolytic salt were dissolved in a solution of acetonitrile-water-ethylene glycol (90:5). Electrochemical reaction (polymerization) time varied from 5 to 60 minutes. Although the Nesa glass substrate was covered with the insulating film, black polypyrrole was precipitated upon application of an electric field, and its thickness was increased. FIG. 3 shows the relationship between the polymerization time (minutes) of pyrrole and the electrical conductivity ($\sigma$) of the resultant film. According to this graph, it was found that when polymerization time changed, electrical conductivity of the film can be changed about $10^9$ times, and that film having a desired conductivity was prepared.

TABLE 1

| Example | Substrate | Crosslinked film | Solvent composition (excluding pyrroles and salts) | Total thickness ($\mu$m) | Conductivity (/$\Omega \cdot$ cm) |
|---|---|---|---|---|---|
| 2 | Nesa glass | Novolak resin | $CH_3CN$ | 1.5 | 4.0 |
| 3 | Gold-deposited glass | Novolak resin | $CH_3CN$ | 1.6 | 6.0 |
| 4 | Nesa glass | Resole resin | $CH_3CN$ | 1.5 | 3.5 |
| 5 | Nesa glass | AZ-1350 | $CH_3CN$ | 1.7 | 7.1 |
| 6 | Nesa glass | RTV silicone resin | $CH_3CN/H_2O/EG = 98/1/1$ | 2.5 | 12.0 |
| 7 | Nesa glass | Polyglycidylmethacrylate | $CH_3CN/H_2O/EG = 98/1/1$ | 1.5 | 5.0 |
| 8 | Nesa glass | Cyclic butadiene rubber | $CH_3CN$/cyclohexane (9:1) | 2.2 | 7.5 |

EXAMPLE 17

Polyvinyl chloride film was formed by casting on a Nesa glass substrate to a thickness of 1.2 μm. On the substrate with polyvinyl chloride film, pyrrole was electrochemically polymerized in an electrolytic solution for 20 minutes at a voltage of 1.2 V. The electrolytic solution was obtained such that 1 mol/l of pyrrole and 0.3 mol/l of tetraethylammonium perchlorate were dissolved in a solvent mixture of acetonitrile-tetrahydrofuran-water-ethylene glycol (58:40:1:1). As a result, polypyrrole was formed. The electrical conductivities of the upper and lower surfaces of the single layer were 8/Ω.cm and 3/Ω.cm.

COMPARATIVE EXAMPLE

Even if the same film as in Example 17 was electrochemically polymerized in a solution of acetonitrile/ethanol (1:4), the formation of polypyrrole was not observed.

As is apparent from Example 17 and the Comparative Example, the electrochemical polymerization solvent must be optimized for each resin so as to prepare a uniform film. In other words, the monomer must be sufficiently diffused in an insulating polymer film and must reach the electrode surface. In this Comparative Example, it is suggested that no diffusion occurs since ethanol does not serve as a solvent to cause swelling of polyvinyl chloride film. In the above-mentioned examples, electrochemically oxidized polypyrrole can grow in the film when a sufficient space is produced in the insulating polymer film by swelling, thereby obtaining composite films.

EXAMPLES 18-58

Thermoplastic resin films shown in Table 3 were coated by spin coating or casting on corresponding Nesa glass substrates to a thickness of 1 micron. 1 mol/l of pyrrole and 0.3 mol/l of tetraethylammonium tetrafluoroborate were dissolved in each of the solvents shown in Table 3. On the resultant substrates with the respective resin films, pyrrole was electrochemically polymerized in the corresponding solvents for 20 minutes at a voltage of 1.2 V. As a result, black polypyrrole was formed on each of the films. The resultant films were uniform in the same manner as in Example 16.

The thicknesses of the composite films and the electrical conductivities thereof were measured, as shown in Table 3.

Referring to Table 3, the substrate comprised the Nesa glass substrate, polymerization was carried out for 20 minutes at room temperature. Reference symbol MEK denotes methyl ethyl ketone; EG, ethylene glycol; and DMF, N,N-dimethylformamide.

TABLE 3

| Example | Thermosplastic resin film | Solvent composition (excluding pyrroles and salts) | Total thickness (μm) | Conductivity (/Ω · cm) |
|---|---|---|---|---|
| 18 | Polystyrene | $CH_3CN/MEK/H_2O$ = 94:5:1 | 1.35 | 1.2 |
| 19 | Poly-α-methylstyrene | $CH_3CN/MEK/H_2O$ = 94:5:1 | 1.4 | 1.8 |
| 20 | Polychlorostyrene | $CH_3CN/H_2O/EG$ = 98:1:1 | 1.35 | 0.9 |
| 21 | Poly-4-bromostyrene | $CH_3CN/H_2O/EG$ = 98:1:1 | 1.5 | 3.5 |
| 22 | Styrene-butadiene copolymer (80:20) | $CH_3CN/THF$ = 50:50 | 1.6 | 3.2 |
| 23 | Poly-β-vinylnaphthalene | $CH_3CN$ | 1.4 | 4.0 |
| 24 | Polyacenaphthylene | $CH_3CN$/chlorobenzene = 4:1 | 1.6 | 6.0 |
| 25 | Polyvinylcarbazole | $CH_3CN/H_2O/EG$ = 98:1:1 | 1.6 | 9.5 |
| 26 | Polyvinylpyrene | $CH_3CN$ | 1.3 | 5.5 |
| 27 | Polymethylmethacrylate | $CH_3CN/H_2O/EG$ = 84:15:1 | 1.7 | 8.2 |
| 28 | Polyethylmethacrylate | $CH_3CN/H_2O/EG$ = 84:15:1 | 1.6 | 6.0 |
| 29 | Polyhexamethylene-adipamide | $CH_3CN/DMF$ = 4:1 | 1.4 | 3.1 |
| 30 | Polycaprolactum | $CH_3CN/DMF$ = 4:1 | 1.4 | 0.85 |
| 31 | Ethylcellulose | $CH_3CN/EG$ = 8:2 | 1.4 | 2.5 |
| 32 | Cellulose acetate | Propylene carbonate/$H_2O$ = 9:1 | 1.45 | 3.1 |
| 33 | Cellulose nitrate (N 12%) | $CH_3CN/H_2O/EG$ = 90:9:1 | 1.28 | 0.95 |
| 34 | Polyurethane (Polypropylene oxide) | Propylene carbonate/phenol = 8:2 | 1.25 | 0.55 |
| 35 | Polyethylene terephthalate | $CH_3CN$/phenol/nitrobenzene = 1:1:1 | 1.5 | 4.3 |
| 36 | Polyethylene oxide | $CH_3CN$/1,4-dioxane = 1:1 | 1.42 | 1.8 |
| 37 | Polyacetoaldehyde | $CH_3CN/CHCl_3$ = 9:1 | 1.52 | 2.2 |
| 38 | Polyacrylamide | $CH_3CN/EG/H_2O$ = 8:1:1 | 1.35 | 2.7 |
| 39 | Polyacrylonitrile | $CH_3CN$ | 1.53 | 4.1 |
| 40 | Polyvinylisocyanate | $CH_3CN/DMF$ = 8:2 | 1.29 | 1.15 |
| 41 | Poly-2-vinylpyridine | $CH_3CN/EG$ = 99:1 | 1.41 | 3.0 |
| 42 | Polyvinyl methyl ketone | $CH_3CN/EG/H_2O$ = 90:5:5 | 1.38 | 1.1 |
| 43 | Polymethylisopropenyl ketone | $CH_3CN/EG/H_2O$ = 90:5:5 | 1.35 | 1.6 |
| 44 | Polyvinylisobutyl ether | $CH_3CN/EG/H_2O$ = 90:5:5 | 1.41 | 2.0 |
| 45 | Polyvinyl formal | $CH_3CN/EG/H_2O$ = 80:15:5 | 1.45 | 3.8 |
| 46 | Polyvinyl acetal | $CH_3CN/H_2O$ = 7:3 | 1.35 | 2.1 |
| 47 | Polyvinyl acetate | $CH_3CN/EG/H_2O$ = 80:19:1 | 1.38 | 1.9 |
| 48 | Polyvinyl alcohol | $CH_3CN/H_2O$ = 9:1 | 1.35 | 1.6 |

TABLE 3-continued

| Example | Thermoplastic resin film | Solvent composition (excluding pyrroles and salts) | Total thickness ($\mu$m) | Conductivity (/$\Omega \cdot$ cm) |
|---|---|---|---|---|
| 49 | Polychloroprene | $CH_3CN$/cyclohexanone = 8:2 | 1.28 | 0.82 |
| 50 | Polyisobutene | $CH_3CN$/tetrahydrofuran = 85:15 | 1.25 | 0.70 |
| 51 | Polyethylene | $CH_3CN$/chlorobenzene/-tetrachloroethane = 45:40:15* | 1.19 | 0.45 |
| 52 | Polypropylene | $CH_3CN$/isoamylacetate/-tetrachloroethane = 60:30:10* | 1.22 | 0.82 |
| 53 | Natural rubber | $CH_3CN$/chlorobenzene = 65:35 | 1.25 | 0.58 |
| 54 | Polyvinylpyrrolidone | $CH_3CN$/EG = 95:5 | 1.41 | 4.8 |
| 55 | Poly(vinylidenechloride-vinylchloride) 88:12 | $CH_3CN$/tetrahydrofuran (1:1)** | 1.40 | 8.1 |
| 56 | Polyvinylidenechloride | $CH_3CN$/tetrahydrofuran (1:1)** | 1.42 | 2.5 |
| 57 | Polyvinylbutyral | $CH_3CN$/EG/$H_2O$ = 6:2:2 | 1.41 | 3.2 |
| 58 | Polyhexamethylene carbonate | $CH_3CN$/chlorobenzene = 7:3 | 1.25 | 0.71 |

*Polymerized at 65° C
**Tetraethylammonium p-toluenesulfonate (0.3 M) used as salt As is apparent from Table 3, it was found that any type of film had high electrical conductivity. In this manner, any thermoplastic resin film coated as a thin film on the substrate can be properly converted to an electrically conducting polymer film by properly selecting composition of an electrochemical polymerization solution. Therefore, the thermoplastic resin films used in the present invention are not limited to those described with reference to the Examples, but may be extended to any thermoplastic film.

EXAMPLE 59-83

Thermoplastic resin films shown in Table 4 were coated by spin coating or casting on corresponding Nesa glass substrates to a thickness of 1 micron. 1 mol/l of pyrrole and 0.3 mol/l of tetraethylammonium perchlorate or tetraethylammonium p-toluenesulfonate were dissolved in each of the solvents shown in Table 4. On the resultant substrates with the respective resin films, pyrrole was electrochemically polymerized in the corresponding solvents for 20 minutes at a voltage of 1.2 V. As a result, black polypyrrole was formed on each of the films. The resultant films were uniform in the same manner as in Example 16.

Thicknesses of the composite films and the electrical conductivities thereof were measured, as shown in Table 4.

Referring to Table 4, the substrate comprised the Nesa glass substrate, polymerization time was 20 minutes and polymerization temperature was room temperature. Symbols used for the solvents denote the same as in Table 3.

TABLE 4

| Example | Thermoplastic resin film | Solvent composition (excluding pyrroles and salts) | | Total thickness ($\mu$m) | Conductivity (/$\Omega \cdot$ cm) |
|---|---|---|---|---|---|
| 59 | Vinylchloride-vinylacetate copolymer (81:19) | $CH_3CN$ | *1 | 1.4 | 25 |
| 60 | Vinylchloride-acrylonitrile copolymer (88:12) | $CH_3CN$/MEK (4:1) | *1 | 1.3 | 18 |
| 61 | Vinylchloride-methyl acrylate copolymer (91:9) | $CH_3CN$ | *1 | 1.5 | 20 |
| 62 | Vinylchloride-dimethyl maleate copolymer (78:22) | $CH_3CN$ | *1 | 1.5 | 15 |
| 63 | Vinylchloride-vinyl stearate copolymer (95:5) | $CH_3CN$/tetrahydrofuran (9:1) | *1 | 1.35 | 4.5 |
| 64 | Styrene-acrylonitrile copolymer (85:15) | $CH_3CN$/MEK (4:1) | *2 | 1.5 | 5.1 |
| 65 | Styrene-methacrylonitrile copolymer (82:18) | $CH_3CN$/MEK (4:1) | *2 | 1.4 | 6.8 |
| 66 | Acrylonitrile-styrene-butadiene copolymer (20:65:15) | $CH_3CN$/tetrahydrofuran (2:1) | *2 | 1.45 | 0.85 |
| 67 | Styrene-acrylic acid copolymer (74:26) | $CH_3CN$ | *2 | 1.35 | 12 |
| 68 | Styrene-maleic anhydride copolymer | $CH_3CN$/tetrahydrofuran | *2 | 1.5 | 2.5 |

TABLE 4-continued

| Example | Thermoplastic resin film | Solvent composition (excluding pyrroles and salts) | | Total thickness ($\mu$m) | Conductivity (/$\Omega \cdot$ cm) |
|---|---|---|---|---|---|
| | (50:50) | (3:1) | | | |
| 69 | Styrene-diethyl phthalate copolymer (52:48) | CH$_3$CN | *2 | 1.4 | 8.5 |
| 70 | Chlorinated polypropylene | CH$_3$CN/MEK (2:1) | *1 | 1.35 | 0.6 |
| 71 | Chlorinated polyethylene | CH$_3$CN/MEK (1:1) | *1 | 1.32 | 0.08 |
| 72 | Ethylene-acrylic acid copolymer (92:8) | CH$_3$CN/monochlorobenzene/tetrahydrofuran (2:1:1) | *1 | 1.3 | 0.06 |
| 73 | Ethylene-maleic anhydride copolymer (85:15) | CH$_3$CN/DMF/monochlorobenzene (7:1:2) | *1 | 1.3 | 0.05 |
| 74 | Ethylene-vinylacetate copolymer | CH$_3$CN/DMF/monochlorobenzene (8:1:1) | *1 | 1.32 | 0.09 |
| 75 | Polyvinylfluoride | CH$_3$CN | *1 | 1.4 | 13 |
| 76 | Polyvinylidene fluoride | CH$_3$CN/ethyl alcohol (1:1) | *1 | 1.35 | 4.2 |
| 77 | Vinylidene fluoride-trifluoroethylene copolymer (52:48) | CH$_3$CN/EG/water (9:0.9:0.1) | *1 | 1.46 | 10.5 |
| 78 | Vinylidene fluoride-trifluoroethylene copolymer (72.5:27.5) | CH$_3$CN/DMF/EG (9:0.9:0.1) | *1 | 1.3 | 5.1 |
| 79 | Nylon 12 | CH$_3$CN/dimethylsulfoxide (9:1) | *2 | 1.25 | 0.9 |
| 80 | Nylon 6/12 | CH$_3$CN/DMF (4:1) | *2 | 1.4 | 4.1 |
| 81 | Nylon 6/10 | CH$_3$CN/DMF (4:1) | *2 | 1.35 | 3.0 |
| 82 | Polyhexamethylene-fumarate | CH$_3$CN/tetrahydrofuran (5:1) | *2 | 1.35 | 0.85 |
| 83 | Amylose | CH$_3$CN/dimethylsulfoxide | *1 | 1.3 | 0.55 |

*1: Tetraethylammonium perchlorate (0.3 M) used as salt
*2: Tetraethylammonium p-toluenesulfonate (0.3 M) used as salt

EXAMPLES 84–89

Polyvinylchloride film was casted Nesa glass substrates to a thickness of about 1.2 micron in the same manner as in Example 17. These substrates were used as positive electrodes, respectively. 3-methylpyrrole (Example 84), N-methylpyrrole (Example 85), thiophene (Example 86), azulene (Example 87), methylazulene (Example 88) and pyrene (Example 89) were dissolved in the respective solvents shown in Table 4. A platinum electrode served as the counter electrode in each of the solvents. On the substrates each monomer was electrochemically polymerized for 20 minutes. The thicknesses of the resultant films were increased, and the electrical conductivities thereof were also increased. The test results are summarized in Table 5.

Referring to Table 5, the substrate comprises the Nesa glass substrate, polyvinylchloride thickness was about 1 micron, polymerization time was 20 minutes and polymerization temperature was room temperature. The electrolyte in each of the Examples 84 to 87 was 0.3 mol/l of tetraethylammonium perchlorate.

TABLE 5

| Example | Conductive polymer | Solvent composition | Total thickness ($\mu$m) | Conductivity (/$\Omega \cdot$ cm) |
|---|---|---|---|---|
| 84 | Poly-3-methylpyrrole | CH$_3$CN/H$_2$O/EG = 96:2:2 | 1.5 | 2.5 |
| 85 | Poly-N—methylpyrrole | CH$_3$CN/H$_2$O/EG = 98:1:1 | 1.6 | $5 \times 10^{-4}$ |
| 86 | Polythiophene | Nitrobenzene/ethyl alcohol (1:1) | 1.4 | 4.5 |
| 87 | Polyazulene | CH$_3$CN/H$_2$O/EG = 98:1:1 | 1.65 | $3 \times 10^{-3}$ |
| 88 | Polymethylazulene | CH$_3$CN/DMF = 98:2 Tetrabutylammonium perchlorate 0.3 M | 1.8 | $2 \times 10^{-6}$ |
| 89 | Polypyrene | CH$_3$CN/DMF = 98:2 Tetrabutylammonium perchlorate 0.3 M | 1.75 | $1.2 \times 10^{-4}$ |

EXAMPLES 90 and 91

1.2 μm thck polyvinylchloride film was casted on a glass substrate (Example 90) deposited with 0.1-micron thick gold, or on an n-type phosphorus-doped silicon substrate (Example 91) having a resistivity of 15 Ω.cm. These substrates were dipped together with the corresponding counter electrodes in a solution obtained such that 3 mols/l of pyrrole and 0.3 mol/l of tetraethylammonium p-toluenesulfonate were dissolved in acetonitrile. The substrate was electrochemically polymerized at a voltage of 1.2 V for 20 minutes. As a result, a film was formed on the gold-deposited substrate to a thickness of 1.8 microns, and a film was formed on the n-type silicon substrate to a thickness of 1.65 microns. The electrical conductivities of these films were 6.0/Ω.cm and 3.2/Ω.cm, respectively. In this manner, uniform electrically conducting polymers were formed on the metal substrate and on the semiconductor substrate, respectively.

EXAMPLE 92

A Nesa glass substrate was placed in a reaction chamber to which styrene was introduced at a vapor pressure of $2.5 \times 10^{-2}$ Torr. An RF power having a frequency of 13.56 MHz was applied to the reaction chamber. The substrate was exposed at a discharge power of 10 W, a gas flow rate of 10 cc/minute, and a substrate temperature of 40° C. for 15 minutes. A plasma polymerized polystyrene film having a thickness of about 1.0 micron was obtained. This substrate with the film was used as a cathode, and a net-like platinum electrode was used as an anode. These electrodes were dipped in an electrochemical polymerization solution, and pyrrole was electrochemically polymerized at a constant voltage of 1.3 V.

The electrochemical polymerization solution was prepared such that 1 mol/l of pyrrole and 0.3 mol/l of tetraethylammonium tetrafluoroborate as an electrolytic salt were dissolved in acetonitrile. By applying voltage, polypyrrole was formed on the substrate. A thickness of the composite film was increased. After 5 minutes polymerization, the film was washed and dried. The thickness of the composite film was measured to be about 1.2 microns. The electrical conductivity along the direction of the film thickness was less than 1/Ω.cm. The electrical conductivity along the direction of the thickness before polymerization was $10^{-9}$/Ω.cm. Therefore, by 5-minute polymerization, conductivity was increased by more than $10^8$ times. However, the resultant film was strongly adhered to the Nesa glass substrate, so an accurate electrical conductivity of the conducting film could not be measured.

EXAMPLE 93

In the same manner as in Example 92, a Nesa glass substrate coated with a plasma polymerized polystyrene film was electrochemically polymerized in the same electrolytic solution as in Example 92 for one hour. A a result, a black polymer film having a thickness of 2.5 microns was obtained. This film could be peeled from the substrate and had a high electrical conductivity of 35/Ω.cm.

EXAMPLE 94

A Nesa glass substrate was placed in a reaction chamber to which methylmethacrylate was introduced at a vapor pressure of $4 \times 10^{-2}$ Torr. An RF voltage having a frequency of 13.56 MHz was applied to the reaction chamber. The substrate was exposed at a discharge power of 10 W, a gas flow rate of 20 cc/minute, and a substrate temperature of 20° C. for 3 and 15 minutes. Plasma polymerized polymethylmethacrylate films having thicknesses of about 0.4 micron and 1.1 microns were obtained. Electrochemical polymerization was performed for 20 minutes under the same conditions as in Example 92. No polypyrrole was grown on the 1.1-micron thick film. However, polypyrrole was uniformly grown on the 0.4-micron thick film. This film could be peeled from the substrate. Therefore, the polypyrrole film was deposited on only the electrode side of the substrate, thereby obtaining a two-layer structure. Electric conductivity of the polypyrrole surface was about 50/Ω.cm.

EXAMPLE 95

A Nesa glass substrate was placed in a reaction chamber to which methylmethacrylate was introduced at a vapor pressure of $4 \times 10^{-2}$ Torr. An RF voltage having a frequency of 13.56 MHz was applied to the reaction chamber. The substrate was exposed at a discharge power of 10 W, a gas flow rate of 20 cc/minute, a substrate temperature of 20° C. In this case, a cycle consisting of a discharge time of 10 seconds and a nondischarge time of 90 seconds was repeated for 60 minutes. A plasma polymerized polymethylmethacrylate film having a thickness of about 1.1 microns was obtained. This substrate was dipped in an electrolytic solution prepared such that 1 mol/l of pyrrole and 0.3 mol/l of tetraethylammonium tetrafluoroborate were dissolved in a solvent mixture of acetonitrile:dimethylsulfoxide (95:5). On the substrate, pyrrole was electrochemically polymerized at a voltage of 1.2 V for 20 minutes. A black polypyrrole-plasma polymerized polymethylmetacrylate composite film having a thickness of 1.4 microns was obtained. Resistance of this film along its thickness was very small, and the film had good adhesion. The film was partially cut from the substrate, and its electrical conductivity was 2.5/Ω.cm.

EXAMPLE 96

A Nesa glass substrate coated with the same film as in Example 95 was dipped in a solution of acetonitrile-dimethylsulfoxide (95:5) dissolved with 1.5 mols/l of thiophene and 0.3 mol/l of AgClO$_4$ and was electrochemically polymerized at a voltage of 1.5 V for 20 minutes. As a result, a brown film having a thickness of 1.35 microns was obtained. This film had good adhesion with the substrate. The film was partially cut from the substrate, and its electrical conductivity was 1.2/Ω.cm.

In the above example, the film was entirely changed conductive. However, when polymerization time is properly set, the film has only one conducting surface. This example will be described below.

EXAMPLE 97

A polyvinylchloride film (molecular weight of 70,000) was coated by casting on a Nesa glass substrate to a thickness of about 3 microns. This substrate was dipped together with a platinum counter electrode in an electrolytic solution obtained such that 0.3 mol/l of tetraethylammonium p-toluenesulfonate and 1 mol/l of pyrrole were dissolved in a solvent mixture of acetonitrile:nitrobenzene (3:1). On the substrate pyrrole was electrochemically polymerized at a voltage of 1.6 V for 30 minutes, thereby precipitating black polypyrrole.

The resultant film could be easily peeled from the Nesa glass substrate and was soft, mechanically strong, smooth and glossy. The resultant film was partially cut from the substrate, and the electrical conductivities of the surface side (contacting with the electrolytic solution) and the electrode side (contacting with the Nesa glass substrate) of the film were measured by the 4-terminal method. The conductivities of the surface and electrode sides were $10^{-10}/\Omega.cm$ and $12/\Omega.cm$, respectively. This film could be elongated. No separation between conduction layer and insluating layer was observed.

EXAMPLE 98

A vinylchloride-vinylidene copolymer (82:18) was coated by casting on a Nesa glass substrate to a thickness of 2.5 microns. The substrate coated with this film was dipped together with a platinum counter electrode in an acetonitrile solution dissolved with 0.3 mol/l of tetraethylammonium perchlorate and 1 mol/l of pyrrole. On the substrate pyrrole was electrochemically polymerized at a voltage of 1.6 V for 30 minutes. A glossy black film was obtained and could be easily peeled from the substrate. The electrical conductivity of the surface side was less than $10^{-10}/\Omega.cm$, and the electrical conductivity of electrode side was $8/\Omega.cm$. Even if this film was elongated to 200%, phase separation did not occur, nor did the polypyrrole layer peel off.

EXAMPLE 99

A polyvinylidenefluoride film was coated on a Nesa glass substrate to a thickness of 1.8 microns. This substrate was dipped together with a platinum electrode in an acetonitrile-ethylene glycol solvent mixture (9:1) dissolved with 0.3 mol/l of tetraethyleneammonium p-toluenesulfonate and 1 mol/l of pyrrole. On the substrate, pyrrole was electrochemically polymerized at a voltage of 1.8 V for 30 minutes, thereby precipitating black polypyrrole. The black film could be easily peeled from the substrate and had high mechanical strength.

The electrical conductivity of the surface side was less than $10^{-10}/\Omega.cm$, and the electrical conductivity of the electrode side was $4.5/\Omega.cm$. The resultant film could be elongated to at least 200%, but no film separation could be observed.

As shown in these second examples, the film of which conductivities of both sides greatly differ from each other can be obtained.

EXAMPLE 100

Polyvinylchloride (molecular weight of 700,000) was cast from a methyl ethyl ketone-tetrahydrofuran (1:1) on an ITO substrate, thereby obtaining six samples polyvinyl chloride films each having a thickness of about 1.2 microns.

Figure 12:
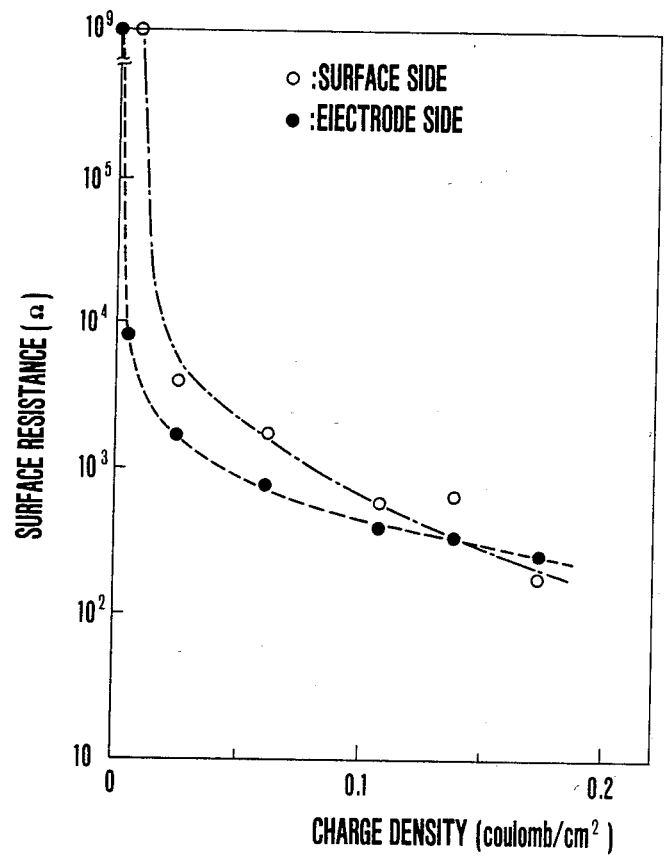
FIG. 12 is a graph showing the relationship between surface resistance of electrically conducting polymer film and charge density in polymerization according to the present invention.

The respective substrates were dipped in a solution obtained by dissolving 1 mol/l of pyrrole and 0.3 mol/l of tetraethylammonium p-toluenesulfonate in acetonitrile and pyrrole was electrochemically polymerized at a voltage of 1.6 V for 2 minutes, 4.5 minutes, 6 minutes, 8 minutes, 10 minutes and 15 minutes, respectively. The resultant films were washed with acetonitrile and dried. Resistances of the both film surface were measured. The results are illustrated in FIG. 12. The electrode side shows high conductivity only by 2 minutes polymerization. The surface resistance was decreased in accordance with a decrease in polymerization time. On the other hand, the surface side remained insulative at the beginning. However, by 4 to 5 minutes polymerization, the surfaces showed conductivity. In other words, two-minute polymerization produced the structure shown in FIG. 2A, and four- or five-minute polymerization produced the structure shown in FIG. 2B. In practice, the structures shown in FIGS. 2A and 2B were confirmed by Augue electron spectroscopy of the film.

Figure 13A:
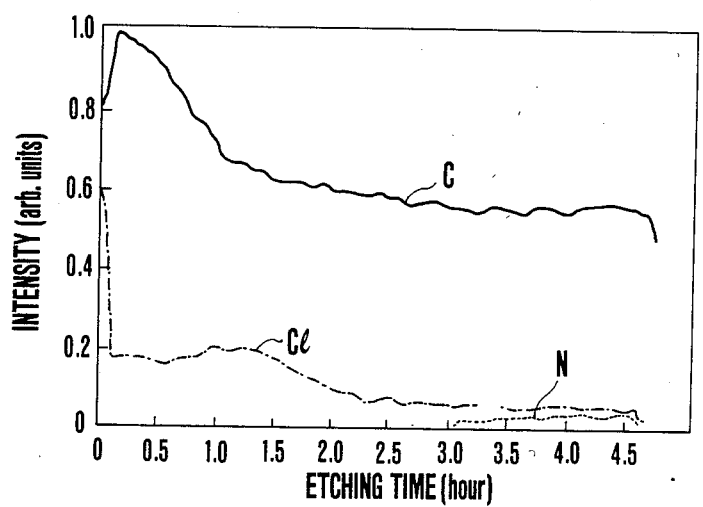
FIGS. 13A and 13B are graphs each showing the relationship between intensity and etching time in Auger Electronic Spectrascopy of the films.
Figure 13B:
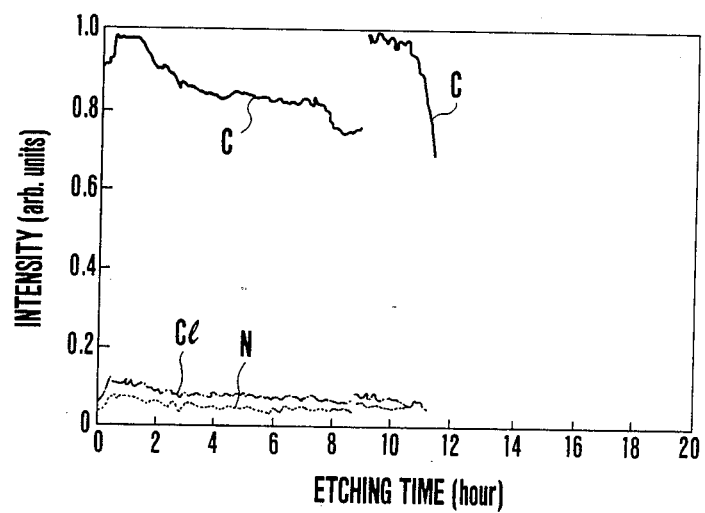

FIG. 13A shows the thickness profile of a polyvinyl chloride-polypyrrole film having a conducting electrode side and an insulating surface side. Carbon and chlorine were uniformly distributed along the thickness of the film, while nitrogen contained in polypyrrole was detected from an intermediate portion of the film. This result confirms that this film has a structure shown in FIG. 2A. On the other hand, referring to FIG. 13B, carbon, chlorine and nitrogen were uniformly distributed along the thickness of a polyvinyl chloride-polypyrrole film in which both sides are conductive. Therefore, two polymers were combined to constitute an electrically conducting polymer film.

These films could be easily peeled from the ITO substrates. The surfaces of these films were smooth and had high mechanical strength. Each of these films could be elongated by about 1.2 times.

EXAMPLE 101

This example shows that a PVC film having a thickness of 30 microns was made conductive.

Polyvinyl chloride (PVC) was casted on an ITO substrate to form a film having a thickness of 30 μm. This substrate was dipped in an acetonitrile-nitrobenzene (4:1) solution containing 1 mol/l of pyrrole and 0.3 mol/l of tetraethyl ammonium p-toluenesulfonate. On the substrate pyrrole was electrochemically polymerized at a voltage of 5 V for 20 minutes. The resultant film was cleaned and dried. The dried film was peeled from the electrode and was subjected to resistance measurement in accordance with the 4-terminal method. A resistance of the electrode side was 250$\phi$, and that of the surface side was 480$\phi$. This film was entirely conductive.

EXAMPLE 102

This example shows that a polyvinylidene fluoride film having a practical thickness was used to obtain an electrically conducting polymer film.

Chromium and gold were deposited on a glass substrate to thicknesses of 100 Å and 1,000 Å to constitute chromium and gold electrodes, respectively. An N,N-dimethylformamide solution of polyvinylidene fluoride was coated to form a polyvinylidene fluoride film having a thickness of 15 microns. The electrode with the film was dipped in an acetonitrile-ethanol (1:1) solution containing 1 mol/l of pyrrole and 0.3 mol/l of tetraethylammonium tetrafluoroborate for 5 minutes. On the electrode pyrrole was electrochemically polymerized at a voltage of 5 V and a charge density of 0.03 C/cm$^2$ to obtain a composite polyvinylidene fluoride film. The resultant film was washed, dried and peeled from the substrate. This film had a thickness of 18 microns. Only the electrode side was conductive (surface resistance of 420$\Omega$), and the surface side was insulative and had a resistance of more than 10 M$\Omega$. Since glass transition point of polyvinylidene fluoride was lower than room temperature, the film had flexibility and was glossy.

In order to test that the mechanical strength of this film was improved, elongation and the Young's modulus were measured. Results are summarized in Table 6 below.

TABLE 6

| | Young's Modulus and Elongation | |
|---|---|---|
| | Young's modulus (dyn/cm$^2$) | Elongation (%) |
| Polyvinylidene fluoride film | 1.7 × 10$^{10}$ | 65% |
| Polypyrrole/BF$_4$ film | 1.2 × 10$^{10}$ | 5% |
| Hybrid conducting film (0.03 C/cm$^2$) | 3.2 × 10$^{10}$ | 60% |

Note:
Film thickness of each film was 18 microns.

The Young's modulus of the composite conducting film was about twice that of the polyvinylidene fluoride film and about two and half times that of the polypyrrole/BF$_4$ film. The elongation of the composite film was 60% which was almost the same as that of the PVDF film and much greater than that (5%) of the polypyrrole film.

As is apparent from the above description, when a high quality film such as the polyvinylidene fluoride film was used, a highly conducting film having high mechanical strength was obtained.

EXAMPLE 103

This example shows that a thick conducting polymer film was obtained by using polyvinylidene fluoride.

Chromium and gold were deposited on an ITO substrate having a sheet resistance of 20Ω/• to thicknesses of 100 Å and 500 Å. The ITO substrate deposited with chromium and gold was used as an electrode. A polyvinylidene fluoride film having a thickness of 150 microns was cast on the substrate.

This film was prepared such that the substrate was dipped in an acetonitrile-ethanol (3:2) solution containing 1 mol/l of pyrrole and 0.5 mol/l of tetraethylammonium p-toluenesulfonate for 10 minutes and was electrochemically polymerized at a voltage of 7 V and a charge density of 0.24 C/cm$_2$.

The resultant film was washed, dried and peeled off from the substrate. Only the electrode side was conductive, and a surface resistance was 620Ω.

Comparative Example

Even if a voltage of 2 V was applied to the same film as in Example 95, a current did not substantially flow therethrough. The surface resistance of the electrode side was more than 50 kΩ. In this manner, when the film thickness was increased, the voltage is better to be slightly increased.

The following Example shows the case wherein two types of insulating polymer films were laminated, and the resultant laminate is changed conductive by an electrochemical polymerization, thereby preparing a composite two-layer conducting polymer film.

EXAMPLE 104

Chloromethylated polystyrene (to be referred to as CMS hereinafter; molecular weight: 300,000) was coated on a Nesa glass substrate to a thickness of 1.5 microns. Light from a 500-W Xe lamp irradiated the film to crosslink the CMS film. A cyclohexane-chlorobenzene (2:1) mixture of ethylene-vinylacetate (88:12) copolymer was spin-coated on the film to form a film having a thickness of 1.0 micron. The resultant substrate was dipped together with a platinum mesh electrode as the counter electrode in an acetonitrile-tetrahydrofuran-chlorobenzene (80:10:10) solvent mixture added with 1 mol/l of pyrrole and 0.3 mol/l of tetraammonium tetrafluoroborate as an electrolyte. On the substrate, pyrrole was electrochemically polymerized at a voltage of 2.0 V for 20 minutes to precipitate black polypyrrole on the substrate. The resultant film had a thickness of 2.9 microns and could be easily peeled from the Nesa glass substrate. The film structure had a two-layer structure wherein a black conducting film obtained by mixing CMS and polypyrrole and an EVA film were laminated. The EVA film had high mechanical strength, so that the resultant two-layer structure also had high mechanical strength. An electrical conductivity of the composite CMS-polypyrrole film was 4.3/Ω.cm, and the EVA film was insulative and had an electrical conductivity less than 10$^{-7}$/Ω.cm. In the two-layer film, since crosslinked CMS was slightly swelled in the casting EVA solvent, CMS and EVA were slightly mixed at an interface thereof. As a result, adhesion between these two layers was good, nor would the layers peel from each other at their interface.

EXAMPLE 105

Five Nesa glass substrates each coated with two films consisting of a CMS film (thickness of 1.5 microns) and an EVA film (thickness of 1.2 microns) in the same manner as in Example 104 were prepared. These substrates were dipped in the same electrochemical polymerization solution as in Example 104 and pyrrole was electrochemically polymerized at a voltage of 2.0 V for 10 seconds, 30 seconds, 2 minutes, 10 minutes and 60 minutes, respectively. When the polymerization time was increased, the film thickness was increased. The respective substrates were covered with uniform, smooth EVA films. Each resultant film comprised a composite CMS-polypyrrole film and was peeled from the corresponding substrate. The electrical conductivities of the CMS-polypyrrole surfaces of the respective composite films were 2×10$^{-4}$, 4×10$^{-2}$, 1×10$^{-1}$, 3.2×10$^{-1}$ and 9.2/Ω.m. The electrical conductities of these films were found to be controlled in accordance with the polymerization time.

EXAMPLE 106

Polyglycidyl methacrylate (to be referred to as PGMA hereinafter; molecular weight: 85,000) was coated to a thickness of 0.2 micron on an n-type silicon substrate having a resistivity of 5/Ω.cm. The PGMA film was baked at a temperature of 200° C. for 30 minutes. Polyvinyl carbazole (to be referred to as PVCZ hereinafter; molecular weight: 460,000) was coated on the PGMA film to a thickness of 1.0 micron. The resultant substrate was used as a positive electrode and was dipped together with a platinum mesh electrode as a counter electrode in an acetonitrile solution dissolved with 1 mol/l of thiophene and 0.2 mol/l of tetraethylammonium perchlorate. On the substrate thiophene was electrochemically polymerized in a nitrogen gas atmosphere at a voltage of 3.0 V for 20 minutes, thereby precipitating bluish black polythiophene on the substrate. This film had a substantially uniform thickness of 1.5 microns and had good adhesion with the substrate. The film was cut from the substrate and subjected to measurement of electrical conductivity from the surface thereof. An electrical conductivity was 0.75/Ω.cm.

Polythiophene was hybridized in two layers of the PGMA and PVCZ layers.

EXAMPLE 107

In the same manner as in Example 106, PGMA and PVCZ were coated on an n-type silicon substrate to thicknesses of 0.8 micron and 0.2 micron, respectively. EVA was then coated to a surface of the PVCZ layer to a thickness of 1.2 microns. The resultant substrate was dipped together with a platinum mesh electrode as a counter electrode in an acetonitrile-tetrahydrofuran-chlorobenzene (9:1:1) solvent containing 1 mol/l of pyrrole and 0.4 mol/l of tetraethylammonium perchlorate. On the substrate pyrrole was electrochemically polymerized at a voltage of 2.0 V for 35 minutes. Polypyrrole was precipitated on the substrate and the composite film had a thickness of 2.6 microns. The resultant film had good adhesion with the substrate. The surface of the film was glossy in the same manner as in the state before electrochemical polymerization was performed. The film was cut off from the substrate, and the structure and electrical conductivity of the film were examined. The EVA layer was laminated on a composite PGMA/PVCZ layer mixed with polypyrrole. The PGMA/PVCZ surface and the EVA surface had electrical conductivities of $16/\Omega.cm$ and $2\times 10^{-8}/\Omega.cm$, respectively. When the laminate film formed on this substrate and the film without the EVA film of Example 105 were exposed to air for 30 days electrical conductivity of the film in Example 105 was decreased by 10%, while the film conductivity of Example 106 was decreased by only 2%. This indicated that the EVA film served as a protective film, and that the stability of the electrically conducting polymer could be improved by the laminate structure.

EXAMPLE 108

Novolak resin (molecular weight of 8,000) was coated on a Nesa glass substrate to a thickness of 0.2 micron and was baked at a temperature of 200° C. for 30 minutes. Poly-2-vinylnaphthalene (molecular weight of 18,000) was coated on the novolak resin film to a thickness of 1.1 microns. The resultant substrate was dipped in an acetonitrile-water-ethylene glycol (98:1:1) solution added with 1 mol/l of 3-methylpyrrole and 0.4 mol/l of tetraethylammonium p-toluenesulfonale. On the substrate, 3-methylpyrrole was electrochemically polymerized at a voltage of 1.4 V for 20 minutes to precipitate bluish black poly-3-methylpyrrole. The resultant film had good adhesion with the substrate and was entirely mixed with conducting poly-3-methylpyrrole. The film was peeled from the substrate, and its electrical conductivity was $0.5/\Omega.cm$.

EXAMPLE 109

Chromium and gold were deposited on a glass substrate to thicknesses of 100 Å and 500 Å. A polyvinyl carbazole film having a thickness of 5 microns was prepared by casting from a tetrahydrofuran solution of polyvinyl carbazole (molecular weight of 460,000). The resultant substrate was dipped together with a platinum-plated titanium mesh electrode as a counter electrode in an acetonitrile solution containing 1 mols/l of pyrrole and 0.3 mol/l of tetraethylammonium tetrafluoroborate. The pyrrole was electrochemically polymerized at a voltage of 3.0 V for a predetermined period of time. The polymerized film was washed, dried and peeled from the substrate. The visible light absorption spectrum of the film was measured by a double beam spectrophotometer UVIDEC-505 available from JASCO. The surface resistivity was measured by 4-terminal method. The surface resistivities ($\Omega.cm$) of various films were plotted along the abscissa, and the transmittances (%) thereof were plotted along the ordinate in FIG. 4. In the films prepared in Example 109, the transmittance was more than 50%, and the electrical conductivity was up to a high conductivity of $1/\Omega.cm$.

In this manner, an electrically conducting film with a high transmittance could be prepared and could be used as a transparent antistatic film.

However, it is difficult to obtain a highly conductive polymer film with a high transmittance. When such a film has a large thickness, only one surface can be changed electrically conductive.

EXAMPLE 110

A cyclohexanone solution of vinylidene chloride-vinylchloride copolymer (80:20) was cast on an ITO substrate to prepare a 35-micron film. The substrate with the film was dipped in an acetonitrile-nitrobenzene (4:1) solution containing 1 mol/l of pyrrole and 0.3 mol/l of tetraethylammonium perchlorate and pyrrole was electrochemically polymerized at a voltage of 2 V for 1.5 minutes (0.02 $C/cm^2$). The resultant film was washed, dried and peeled from the substrate and subjected to measurement of a surface resistance and a transmittance. The electrode side of the film was conductive to a surface resistance of $2,500\Omega$, and the film surface side was insulative to a surface resistance of more than $10^9 \Omega$. A transmittance of the film was 72%. In this manner, a film having a large thickness, one conducting surface and a high transmittance was obtained.

EXAMPLE 111

Chromium was deposited on a glass substrate to a thickness of 400 Å. An indium tin oxide (ITO) layer was sputtered on the chromium film to a thickness of 1,500 Å. These layers were used as the electrode side for electrochemical polymerization. A tetrahydrofuran solution of polyvinyl chloride was cast on the surface of the resultant substrate to form a polyvinyl chloride film having a thickness of 35 microns.

On the other hand, an acetonitrile-nitrobenzene (2:1) solution was prepared as an electrochemical polymerization solution containing 1.5 mols/l of pyrrole and 0.4 mol/l of tetraethylammonium p-toluenesulfonate.

The electrode with the polyvinyl chloride film was dipped together with a platinum-plated titanium mesh electrode as a counter electrode in the electrochemical polymerization solution. A voltage of 2.0 V was applied between two electrodes, and electrochemical polymerization was performed for 2 minutes. A resultant film was washed, dried and peeled from the electrode. At this stage, the electrode side of film was conductive. Then, the surface side of the film was thermally sticked to the electrode surface at a temperature of 60° C. Again, the electrode with the film was dipped together with the platinum-plated titanium mesh electrode in the electrochemical polymerization solution and the electrochemical polymerization was carried out at a voltage of 2.0 V for 2 minutes. Thus, both sides of film was changed conductive. A resultant film was washed, dried and peeled from the electrode. The electrical resistance and transmittance of the film were measured. The results are summarized in Table 7.

TABLE 7

| Thickness | 35.2 to 35.5 microns |
|---|---|
| Sheet resistance of upper surface *1 | 4.2 to 5.0 kΩ/□ |
| Sheet resistance of lower surface *1 | 4.5 to 5.3 kΩ/□ |
| Resistance along thickness | $>10^8$ Ω |
| Transmittance (633 nm) | 52% |

*1 The surface of the film which contacts the electrode in the first electrochemical polymerization is defined as the upper surface, and the surface which contacts the electrode in the second electrochemical polymerization is defined as the lower surface. (A square indicates 1 cm².)

As is apparent from Table 7, the conductive property was attributed to the surface and electrode sides of the film and the portion along the direction of thickness of the film indicated a high resistance. The film had a high transmittance of more than 50%.

EXAMPLE 112

An N,N-dimethylformamide solution of polyvinylidene fluoride was cast on the same electrode as in Example 111 to form a film having a thickness of 15 microns.

On the other hand, a nitrobenzene-ethanol (5:1) solution containing 1 mol/l of 3-methylthiophene and 0.3 mol/l of tetraethylammonium perchlorate was prepared.

The electrode with the polyvinylidene fluoride film was dipped in the electrochemical polymerization solution. A voltage of 4.0 V was applied between the electrode with the polyvinylidene fluoride film and the platinum-plated titanium mesh electrode, and polymerization was performed for one minute to prepare a 3-methylthiophene film. This film was washed, dried and peeled from the electrode.

Then, the surface side of this film was thermally sticked to the electrode surface. The electrode was dipped in an electrochemical polymerization solution of 3-methylthiophene and electrochemical polymerization was carried out at a voltage of 4.0 V for one minute, thereby polymerizing methylthiophene. The resultant film was washed, dried and peeled from the electrode. The electrical resistance and transmittance of the film were measured. The results are summarized in Table 8.

TABLE 8

| Thickness | 15.5 to 15.8 microns |
|---|---|
| Sheet resistance of upper surface | 7.4 to 8.6 kΩ/□ |
| Sheet resistance of lower surface *1 | 7.5 to 8.6 kΩ/□ |
| Resistance along thickness | $>10^8$ Ω |
| Transmittance (633 nm) | 43% |

As is apparent from Table 8, electrical conduction was attributed to the surface and electrode sides of the film. A portion along the direction of thickness of the film indicated a high resistance. The film had a high transmittance of more than 62%.

The following example will be suitable for continuous formation of an electrically conducting polymer film.

EXAMPLE 113

A polyvinylidene fluoride film having a thickness of 12 microns was set in the manufacturing apparatus shown in FIG. 9. The stainless steel thermal transfer roller 88 was heated to a temperature of 50° C. A film was transferred to a drum-like electrode (made of a platinum-plated titanium drum). An electrochemical polymerization solution comprised an acetonitrile-ethanol (4:1) solution containing 2.0 mols/l of pyrrole and 1.0 mol/l of tetraethylammonium perchlorate. The film coated on the drum-like electrode was subjected to electrochemical polymerization at a voltage of 3.5 V for 10 minutes. The resultant film was washed with water, air dried, and wound. The surface side of the resultant film had a resistance of 800Ω, and the electrode side thereof had a low resistance of 350Ω.

EXAMPLE 114

Chromium and indium tin oxide (ITO) were deposited on a glass substrate to thicknesses of 100 Å and 500 Å, thereby constituting an electrochemical polymerization electrode. A cyclohexanone solution containing 15 parts by weight of polyvinylidene fluoride and heated at a temperature of 130° C. was cast on the electrode. The electrode with film was dipped in ethanol and dried to obtain a translucent porous film having a thickness of 0.5 mm. A porosity of this film was 45%.

On the other hand, an acetonitrile-N,N-dimethylformamide (9:1) containing 1 mol/l of pyrrole and 0.3 mol/l of tetraethylammonium tetrafluoroborate was prepared as an electrochemical polymerization solution. The electrode with the film was dipped in this solution. A voltage of 2.5 V was applied between this electrode and a platinum mesh electrode as a counter electrode for 30 minutes, thereby polymerizing pyrrole.

Black conducting polypyrrole was precipitated on the electrode. The film was removed from the electrode, and electrical conductivities of the portion along the direction of thickness, the lower surface and the upper surface were measured to be 4.2/Ω.cm, 6.5/Ω.cm and 3.4/Ω.cm. In this manner, the film was entirely conductive.

EXAMPLE 115

A methylisobutylketone solution of polyglycidyl methacrylate was spin-coated on an electrode substrate prepared in the same manner as in Example 114 to form a polyglycidyl methacrylate film having a thickness of 2 microns. A porous polycarbonate film NUCLEPORE (trade name) available from NUCLEPORE Corp. and having a thickness of 1 mm was bonded by thermocompression on the polyglycidyl methacrylate film. The resultant substrate was heated in a nitrogen atmosphere at a temperature of 150° C. for 30 minutes.

On the other hand, an acetonitride solution containing 1 mol/l of thiophene and 0.4 mol/l of tetraethylammonium perchlorate was prepared as an electrochemical polymerization solution. The electrode substrate with the film was dipped together with a platinum mesh electrode as a counter electrode in this solution. A voltage of 4.0 V was applied between these two electrodes to form polythiophene. The resultant film was peeled from the substrate, and its electrical conductivity was measured. An electrical conductivity along the direction of thickness of the film was 0.8/Ω.cm, an electrode side thereof was 0.4/Ω.cm, and a surface side thereof was 0.25/Ω.cm. A substantially uniform electrically conducting polymer film was obtained.

EXAMPLE 116

A tetrahydrofuran solution was prepared by mixing polyvinyl chloride resin and carbon black powder having a particle size of 0.2 to 3 microns at a volume ratio of 3:1. Chromium and gold were deposited on a glass substrate to thicknesses of 100 Å and 1,000 Å, and indium tin oxide was sputtered thereon to a thickness of 2,000 Å, thereby preparing an electrochemical polymerization electrode. The tetrahydrofuran solution was coated on the electrode by a doctor blade to obtain a carbon black-containing polyvinylchloride film to a thickness of 50 microns and was oven dried at a temperature of 80° C. for 15 minutes.

On the other hand, an acetonitrile-tetrahydrofuran (2:1) solution containing 1 mol/l of pyrrole and 0.4 mol/l of tetraethylammonium p-toluenesulfonate was prepared as an electrochemical polymerization solution. A voltage of 3.5 V was applied to the electrode with the film and the counter electrode in the electrochemical polymerization solution for 15 minutes, thereby polymerizing pyrrole. The resultant film was obtained such that carbon black and polypyrrole were dispersed in polyvinyl chloride and could be easily peeled from the electrode.

The film had an electrical conductivity of $5 \times 10^{-3}/\Omega.cm$ before electrochemical polymerization. However, when electrochemical polymerization was performed, an electrical conductivity of the electrode side was $25/\Omega.cm$, and the surface side had an electrical conductivity of $22/\Omega.cm$. As a result, a highly conductive uniform polymer film before polymerization was prepared. Although the film before polymerization was brittle, the polymerized film dispersed with polypyrrole had high mechanical strength.

Comparative Example

A polyvinyl chloride film was coated on the same electrode as in Example 116 to a thickness of 50 microns and was dried at a temperature of 80° C. for 15 minutes.

Pyrrole was electrochemically polymerized on the electrode with the film in the same manner as in Example 115. The resultant film was obtained such that polypyrrole was dispersed in polyvinyl chloride. The film was peeled from the substrate. An electrical conductivity of the electrode side was $12/\Omega.cm$, and that of the surface side was $3.5/\Omega.cm$.

When carbon black was not contained in the resultant polymer film, the electrical conductivity was decreased to half, and a difference between the electrical conductivities of the two surfaces was great.

EXAMPLE 117

A methyl ethyl ketone solution was prepared by mixing polystyrene resin and tin oxide powder having a particle size of 0.2 to 0.5 micron at a volume ratio of 3:1. The solution was coated by a doctor blade on the same electrode as in Example 115 to form a tin oxide-containing polystyrene film having a thickness of 80 microns. This film was dried in an oven at a temperature of 100° C. for 15 minutes. On the other hand, an acetonitrile-methyl ethyl ketone containing 1.2 mols/l of thiophene and 0.4 mol/l of tetrabutylammonium p-toluenesulfonate (2:1) was prepared as an electrochemical polymerization solution. The electrode with the film was dipped in this solution for 15 minutes. A voltage of 4.0 V was applied between the electrode with the film and a platinum-plated titanium mesh electrode as a counter electrode for 20 minutes to electrochemically polymerize thiophene. The resultant film was obtained such that tin oxide and polythiophene were dispersed in polystyrene and the film could be easily peeled from the electrode. An electrical conductivity of the film before polymerization was $2 \times 10^{-5}/\Omega.cm$. However, after polymerization the electrical conductivity was increased to $3.2/\Omega.cm$. In addition, the mechanical strength of the film was also improved.

EXAMPLE 118

A solution obtained by mixing nickel powder in an ethylene-vinylacetate resin at a volume ratio of 3:1 was bonded by thermocompression using a thermal transfer roller to form a film having a thickness of 60 microns on the same electrode as in Example 115.

On the other hand, an acetonitrile-tetrahydrofuran-chlorobenzene (2:1:1) containing 1 mol/l of pyrrole and 0.4 mol/l of tetraethylammonium perchlorate was prepared as an electrochemical polymerization solution. A voltage of 3.3 V was applied between the electrode with the film and a platinum-plated titanium mesh electrode as a counter electrode in the electrochemical polymerization solution for 20 minutes, thereby polymerizing pyrrole. The resultant film was obtained such that nickel powder and polypyrrole were dispersed in an ethylene-vinylacetate copolymer and could be easily peeled from the electrode.

An electrical conductivity of the film before electrochemical polymerization was $4.5 \times 10^{-5}/\Omega.cm$. However, after electrochemical polymerization a conductivity of the electrode side was $18/\Omega.cm$, and that of the surface side was $12.5/\Omega.cm$. A highly conductive uniform polymer film was obtained.

The mechanical strength of the film was greatly improved.

EXAMPLE 119

A methyl ethyl ketone solution obtained by mixing 5% by weight of $CBr_4$ in polyvinylchloride (molecular weight of 70,000) was cast on a glass substrate deposited with gold having a thickness of 500 Å to form a film having a thickness of about 50 microns. The substrate with the film was heated at a temperature of 100° C. for 20 minutes to remove $CBr_4$. Thereafter, the substrate was dipped in an acetonitrile solution containing 0.3 mol/l of tetraethylammonium perchlorate and 1 mol/l of pyrrole. The deposited gold film was used as a cathode, and a platinum mesh electrode was used as a counter electrode. A voltage of 3.0 V was applied between the two electrodes for 10 minutes to perform electrochemical polymerization. As a result, black polypyrrole was formed on the substrate. The resultant film was washed, dried and peeled from the substrate. The electrical conductivities of the electrode and surface sides were measured by the 4-terminal method. An electrical conductivity of the electrode side was $12/\Omega.cm$, and that of the surface side was $7.5/\Omega.cm$. In this manner, the entire film was made conductive.

Comparative Example

A methyl ethyl ketone solution was cast on a glass substrate deposited with gold having a thickness of 500 Å to form a polyvinyl chloride (molecular weight of 70,000) film having a thickness of 50 microns. This film was subjected to electrochemical polymerization in the same manner as in Example 111, and polypyrrole was precipitated on the substrate. An electrical conductivity of the electrode side was $5.0/\Omega.cm$, and that of the surface side was $10^{-12}/\Omega.cm$ which represented insulative property. This indicated that polypyrrole was not grown to the surface of the film.

EXAMPLE 120

A chlorobenzene solution obtained by adding 12% by weight of phthalic anhydride in an ethylene-vinyl acetate (82:18) copolymer was cast on a glass substrate deposited with gold having a thickness of 500 Å in a thermostat kept at 50° C., thereby obtaining a film having a thickness of 25 microns. The substrate with the film was placed in a vacuum oven at a reduced pressure of 1 mmHg for 15 minutes to remove phthalic anhydride. Then the substrate was dipped in an acetonitrile-chlorobenzene-cyclohexane (98:1.5:0.5) containing 0.3 mol/l of tetraethylammonium perchlorate and 1 mol/l of pyrrole. The deposited gold layer was used as a cathode, and a platinum mesh was used as an anode. Pyrrole was electrochemically polymerized at a voltage of 3.5 V for 10 minutes. The resultant film was washed, dried and peeled from the substrate. The electrical conductivities of the films were measured in accordance with the 4-terminal method. The electrical conductivity of the electrode side was $12/\Omega.cm$, and that of the surface side was $8/\Omega.cm$. In this manner, the resultant film had a high electrical conductivity. This indicated that polypyrrole was grown throughout the film and had reached its surface.

Comparative Example

In the same manner as in Example 120, by using a chlorobenzene solution of an ethylene-vinyl acetate (82:18) polymer, a film having a thickness of 22 microns was formed on a gold-deposited glass substrate. Pyrrole was electrochemically polymerized in the same manner as in Example 112. No polypyrrole was formed, and two surfaces of the film were insulative.

EXAMPLE 121

A methyl ethyl ketone solution obtained by adding 10% by weight of camphor to polystyrene (molecular weight of 350,000) was cast on a glass substrate deposited with platinum having a thickness of 500 Å, thereby obtaining a film having a thickness of 85 microns. The substrate with the film was exposed in a vacuum oven at a reduced pressure of 1 mmHg and a temperature of 70° C. for 5 minutes to remove camphor. Thereafter, the substrate was dipped in an acetonitrile solution containing 0.5 mol/l of tetraethylammonium p-toluenesulfonate and 1.2 mols/l of thiophene. The deposited platinum layer was used as a cathode, and a platinum mesh electrode as a counter electrode was used as an anode. Thiophene was electrochemically polymerized at a voltage of 4.0 V for 10 minutes to precipitate blue polythiophene. The resultant film was washed, dried and peeled from the substrate. The electrical conductivities of the electrode and surface sides of the film were measured in accordance with the 4-terminal method. An electrical conductivity of the electrode side was $1.5/\Omega.cm$, and that of the surface side was $0.95/\Omega.cm$. The entire film was made highly conductive.

Comparative Example

A methyl ethyl ketone solution of polystyrene (molecular weight of 350,000) was cast on a substrate deposited with platinum having a thickness of 500 Å, thereby obtaining a polystyrene film having a thickness of 80 microns. The film was electrochemically polymerized in the same manner as in Example 113, and polythiophene was precipitated on the substrate. The electrical conductivities of this film were measured in the same manner as in Example 113. A conductivity of the electrode side was $1.3/\Omega.cm$, and that of the surface side thereof was insulative and less than $10^{-12}/\Omega.cm$.

EXAMPLE 122

An acetone solution obtained by adding 15 parts by weight of pyrrole to 100 parts by weight of a polyvinyl chloride was casted on a glass substrate deposited with gold having a thickness of 700 Å, thereby obtaining a pyrrole-containing polyvinylchloride copolymer film having a thickness of 45 microns.

The substrate with the film was dipped in an acetonitrile solution containing 1 mol/l of pyrrole and 0.4 mol/l of tetrabutylammonium perchlorate for 10 minutes. Electrochemical polymerization was then performed at a voltage of 2.5 V for 10 minutes, thereby precipitating polypyrrole.

The electrical conductivities of the film were measured. An electrical conductivity of the electrode side was $8/\Omega.cm$, and that of the surface side was $6.5/\Omega.cm$. In this manner, a substantially uniform conducting film was obtained.

EXAMPLE 123

A tetrahydrofuran-cyclohexanone (1:1) solution containing 18 parts by weight of tetrabutylammonium perchlorate with respect to 100 parts by weight of a vinylidene chloride-vinylchloride (70:30) polymer was cast on a glass substrate deposited with gold having a thickness of 700 Å, so that a film containing tetrabutylammonium perchlorate and having a thickness of 45 microns was obtained.

When pyrrole was electrochemically polymerized on the substrate with this film in the same manner as in Example 111, black polypyrrole was obtained.

Electrical conductivities of this film were measured. A highly conductive film was obtained wherein electrical conductivity of the electrode side was $5.5/\Omega.cm$, and that of the surface side was $4.8/\Omega.cm$.

In the vinylylidene chloride-vinyl chloride copolymer film which did not contain tetrabutylammonium perchlorate, an electrical conductivity of the surface side was less than $10^{-12}/\Omega.cm$.

In Examples 114 and 115, since the electrochemical polymerization solution consisted of pyrrole and tetrabutylammonium perchlorate, the electrochemical polymerization solution would not be contaminated even if pyrrole or tetrabutylammonium perchlorate was contained in the film. However, even if other materials dissolved in the electrochemical polymerization solution were mixed in the film, the same effect could be obtained.

EXAMPLE 124

An aqueous solution containing 20 parts by weight of sodium chloride with respect to 100 parts by weight of polyvinyl alcohol (molecular weight of 120,000) was cast on a glass substrate deposited with platinum having a thickness of 1,000 Å to obtain a polyvinyl alcohol film containing sodium chloride and having a thickness of 20 microns. The substrate with this film was heated at a room temperature for 10 minutes and was dipped in water at a room temperature for 10 minutes to remove sodium chloride. Thereafter, the substrate was dipped in an acetonitrile-water-ethylene glycol (70:10:20) solution containing 1 mol/l of pyrrole and 0.4 mol/l of tetrabutylammonium chloride. A voltage of 3.2 V was applied between the electrodes to electrochemically polymerize pyrrole for 10 minutes. Electrical conductivities of the resultant film were measured. A substantially uniform highly conductive polymer film was prepared wherein an electrical conductivity of the electrode side was 12.0/Ω.cm, and that of the surface side was 8.5/Ω.cm.

Polymerization was performed in polyvinyl alcohol which did not contain sodium chloride under the same conditions. In this case, polypyrrole was slightly precipitated on the electrode side, and the surface side was kept insulative.

EXAMPLE 125

A tetrahydrofuran solution obtained by adding 10% by weight of dioctylphthalate to polyvinylchloride (mclecular weight of 70,000) was casted on a substrate deposited with gold having a thickness of about 500 Å, thereby obtaining a film having a thickness of about 5 microns. The substrate with this film was dipped in an acetonitrile solution containing 0.3 mol/l of tetraethylammonium p-toluenesulfonate and 1 mol/l of pyrrole. The substrate was used as a cathode, and a platinum mesh electrode was used as an anode. Polymerization was performed at a voltage of 3.0 V for 10 minutes. As a result, black polypyrrole was precipitated on the substrate. The resultant film was washed, dried and peeled from the substrate. Electrical conductivities of the electrode and surface sides of the film were measured in accordance with the 4-terminal method. The film was changed entirely conductive such that an electrical conductivity of the electrode side was 20/Ω.cm, and that of the surface side was 16/Ω.cm.

EXAMPLE 126

A chlorobenzene solution obtained by adding 12% by weight of dibutylphthalate to an ethylene-vinyl acetate (82:18) copolymer was cast on a glass substrate deposited with gold having a thickness of about 500 Å in a thermostat heated at a temperature of 50° C., thereby obtaining a film having a thickness of 25 microns. The substrate with this film was dipped in an acetonitrile-chlorobenzene-cyclohexane (80:15:5) solution containing 0.3 mol/l of tetraethylammonium perchlorate and 1 mol/l of pyrrole. The substrate served as a cathode, and a platinum mesh electrode served as an anode. Electrochemical polymerization was performed at a voltage of 3.5 V for 10 minutes. The resultant film was washed, dried and peeled from the substrate. Electrical conductivities of the film were measured in accordance with the 4-terminal method. A highly conductive polymer film was obtained such that an electrical conductivity of the electrode side was 6/Ω.cm and that of the surface side was 3.5/Ω.cm. This indicated that polypyrrole was formed throughout the film and had reached the surface thereof.

In the above two examples, dialkylphthalate was partially dissolved in the electrochemical polymerization solution. Therefore, as compared with the corresponding Comparative Example, it was assumed that the electrochemical polymerization progressed slowly and that the entire film was made highly conductive.

EXAMPLE 127

Nickel was sputtered on a 300-mm square glass substrate to a thickness of 700 Å. Indium tin oxide (ITO) was laminated by evaporation on the nickel surface to a thickness of 1,000 Å.

This substrate was used as a cathode for electrochemical polymerization to render a polyvinyl chloride film conductive. A methyl ethyl ketone solution of polyvinyl chloride (molecular weight of 70,000) was cast on the substrate to form a polyvinyl chloride film having a thickness of 1.5 microns. The polyvinyl chloride film at a corner of the substrate was peeled so as to connect to a DC power terminal.

On the other hand, an acetonitrile-tetrahydrofuran (3:1) solution containing 1.5 mols/l of pyrrole and 0.45 mol/l of tetraethylammonium p-toluenesulfonate was prepared as an electrochemical polymerization solution. The substrate with the above film was dipped together with a platinum-plated titanium mesh electrode as a counter electrode in this solution. A voltage of 3.5 V was applied between these two electrodes for 3 minutes, thereby precipitating black polypyrrole on the substrate.

A composite polyvinyl chloride-polypyrrole film had formed to a thickness of 1.8 microns. This film could be easily peeled from the electrode substrate. The film neither curled nor wrinkled. After the film was peeled off, defects did not form on the surface of the electrode and the electrode could be repeatedly used.

In order to test the uniformity of electrical conductivity of the film, portions spaced apart by 50 mm, 150 mm and 250 mm from the power terminal were cut off and were subjected to measurement of electrical conductivities in accordance with the 4-terminal method. The results are shown in Table 9. The surface of the film which contacted the electrode was defined as the electrode side.

TABLE 9

| Distance from terminal | Surface side (/Ω · cm) | Electrode side (/Ω · cm) |
| --- | --- | --- |
| 50 mm | 10.5 to 12.0 | 12.5 to 13.5 |
| 150 mm | 10.2 to 13.0 | 10.8 to 12.8 |
| 250 mm | 10.5 to 13.3 | 11.2 to 12.5 |

As is apparent from Table 9, the electrical conductivities throughout the electrode side were substantially uniform.

When electrochemical polymerization was performed on a platinum-plated substrate, a composite polyvinyl chloride-polypyrrole film having a thickness of 1.9 microns was obtained. The resultant film could not be peeled from the substrate without defects. When an ITO electrode was deposited on a substrate having a sheet resistance of 50 Ω/□, a composite film having an average thickness of 1.75 microns. However, the surface resistances of the surface side 50 mm and 250 mm apart from the terminal varied by about 3 times, and the corresponding electrode side portions were subject to a 50% difference of electrical conductivities, resulting in nonuniform electrical conductivity distribution.

EXAMPLE 128

Chromium was sputtered on a 300-mm square glass substrate to a thickness of 600 Å. A phosphorus-doped amorphous silicon layer was deposited by CVD on the chromium film to a thickness of 2.5 microns. A sheet resistance of the substrate was 2.3 Ω/□. The substrate was heated at a temperature of 80° C. and a polyvinylidene fluoride film having a thickness of 5 microns was thermocompressively bonded thereto by a thermal transfer roller.

On the other hand, an acetonitrile solution containing 1.6 mols/l of thiophene and 0.4 mol/l of tetraethylammonium tetrafluoroborate was prepared. The substrate with the film was dipped together with a platinum-plated titanium electrode in the solution. A film portion was peeled off at a corner of the substrate to provide an electrode terminal. Thiophene was electrochemically polymerized at a voltage of 4 V for 5 minutes. The resultant film was obtained as a composite film of polyvinylidene fluoride and polythiophene and had a thickness of 5.8 microns. The film could be easily peeled from the substrate and would neither curl nor wrinkle. After the film was peeled from the substrate, defects had not formed on the electrode surface. As a result, the substrate electrode could be repeatedly used.

Electrical conductivities of the film were measured in the same manner as in Example 122 and were substantially uniform as shown in Table 10.

TABLE 10

| Distance from terminal | Surface side (/Ω · cm) | Electrode side (/Ω · cm) |
| --- | --- | --- |
| 50 mm | 12.5 to 13.2 | 13.7 to 16.5 |
| 150 mm | 13.0 to 14.1 | 13.5 to 15.5 |
| 250 mm | 10.2 to 12.7 | 13.2 to 15.0 |

EXAMPLE 129

The manufacturing apparatus shown in FIG. 9 is used.

Chromium was sputtered to a thickness of 600 Å on a surface of an aluminum drum having a diameter of 200 mm and a height of 200 mm. Indium tin oxide (ITO) was deposited by evaporation on the outer surface to a thickness of 1.5 microns. In order to uniformly deposit the ITO film, the drum was rotated while the evaporation was performed. Mylar sheets were adhered to the upper and lower surfaces of the drum to insulating the upper and lower surfaces. Each Mylar sheet had a thickness of 0.5 mm and a hole of a diameter of 10 mm.

The cylindrical electrode 81 was set, as shown in FIG. 9. An ethylene-vinyl acetate (80:20) copolymer film 32 having a thickness of 20 microns was thermocompressively bonded by the thermal transfer roller 83 on the electrode 81. On the other hand, an acetonitrile-chlorobenzene-N,Ndimethylformamide (3:1:1) containing 1.5 mols/l of pyrrole and 0.5 mol/l of tetraethylammonium perchlorate was used as the electrochemical polymerization solution 84. 35% of the electrode was dipped in this solution in the electrochemical polymerization tank 85. A platinum-plated titanium mesh electrode was used as the counter electrode 86, and the terminal 87 was connected to the center of the side surface of the electrode, and a voltage was applied between the terminal 87 and the counter electrode 86 to perform electrochemical polymerization. The drum electrode was rotated so that the polymerization time for each part of film corresponds to 10 minutes. The resultant black film was easily peeled from the electrode, and was washed and dried. The dried film was wound.

The electrical conductivity of this film was found to be substantially uniform 8.0/Ω.cm ±20%.

The present invention is not limited to the above-mentioned examples. Various changes and modifications may be made within the spirit and scope of the invention.

What is claimed is:

1. A method of manufacturing an electrically conducting polymer film comprising the step of providing an insulating polymer film on the surface of an electrode; causing electrolyte solution and aromatic polymer to reach said electrode surface through said insulating polymer film; electrolytically polymerizing said aromatic polymer at the interface between said electrode and said insulating polymer film; and forming an electrically conducting aromatic compound area from said interface of said insulating polymer film toward the inner side of the insulating polymer film.

2. A method according to claim 1, wherein the step of electrolytically polymerizing includes the step wherein an electrode on the electrode substrate is used as a cathode, a counter electrode is used as an anode, both electrodes are dipped in an electrochemical polymerization solution, and a voltage is applied between the two electrodes to perform electrochemical polymerization.

3. A method according to claim 1, wherein the insulating polymer film comprises a crosslinked polymer material.

4. A method according to claim 1, wherein the insulating polymer film comprises a thermoplastic resin.

5. A method according to claim 1, wherein the insulating polymer film comprises a polymer material polymerized by plasma polymerization.

6. A method according to claim 1, wherein the insulating polymer film comprises a polymer film having at least two laminated layers.

7. A method according to claim 1, wherein the insulating polymer film is porous.

8. A method according to claim 1, wherein the insulating polymer film contains a conductive filler.

9. A method according to claim 1, wherein the insulating polymer film is formed on an electrode substrate.

10. A method according to claim 9, wherein the substrate has an electrode made of a material selected from the group consisting of a noble metal, a base metal, a conducting metal oxide and an inorganic semiconductor.

11. A method according to claim 9, wherein the substrate includes an electrode comprising a base metal layer and a conducting metal oxide layer formed thereon.

12. A method according to claim 9, wherein the substrate includes an electrode comprising a base metal layer and a doped inorganic semiconductor layer formed thereon.

13. A method according to claim 9, wherein the substrate has a drum-like shape.

14. A method according to claim 1, wherein the conducting aromatic polymer layer is formed on each of two surfaces of the insulating polymer film.

15. A method according to claim 1, wherein the insulating polymer film contains at least one additive selected from the group consisting of a plasticizer, a pigment and a dyestuff.

16. A method according to claim 1, wherein the insulating polymer film comprises a crosslinking polymer material, and the step of electrolytically polymerizing includes the step of cross linking the insulating polymer film.

17. A method according to claim 9, wherein the step of electrolytically polymerizing includes the steps of: mixing an electrochemical polymer by electrochemical polymerization from a surface of the insluating polymer film which contacts the substrate along a direction of thickness, thereby forming a first conducing aromatic polymer compound layer;

peeling the insluating polymer film from the electrode substrate;

brining a surface of the insluating polymer film which opposes a surface having the first conducting aromatic polymer layer into contact with the electrode substrate; and forming a second conducting aromatic polymer compound layer by electrochemical polymerization performed from the surface contacted by the electrode substrate along a direction toward the first conducting aromatic polymer compound layer.

18. A method according to claim 9, wherein the step of providing the insulating polymer film on the surface of an electrode includes the step of adding a removable material in the insluating polymer film, and the step of electrolytically polymerizing includes the step of removing the removable material before and/or during electrochemical polymerization.

19. A method according to claim 18, wherein the step of removing the removable material comprises a heat treatment.

20. A method according to claim 18, wherein the step of removing the removable material comprises a reduced pressure treatment.

21. A method according to claim 18, wherein the step of removing the removable material comprises a combination of a heat treatment and a reduced pressure treatment.

22. A method according to claim 18, wherein the removable material is a material soluble in an electrochemical polymerization solution.

23. A method according to claim 18, wherein the removable material comprises a material soluble in a solvent.

24. A method according to claim 18, wherein the step of providing the insulating polymer film includes the step of adding a conducting filler in the insulating polymer film.

25. A method according to claim 24, wherein the conducting filler comprises a material selected from the group consisting of a carbon material, a metal oxide and a metal.

26. A method according to claim 1, wherein the insulating polymer film contains at least one additive selected from the group consisting of a plasticizer, a pigment and a dyestuff.

27. A method according to claim 1, wherein the step of providing the insulating polymer film includes the step of coating an adhesive on the electrode and the step of thermocompressively bonding the insulating polymer film to the adhesive.

28. A polymer film made in accordance with the method of any one of the preceeding claims.

* * * * *